US005559933A

United States Patent [19]
Boswell

[11] Patent Number: 5,559,933
[45] Date of Patent: Sep. 24, 1996

[54] DISTRIBUTED ENTERPRISE PRINT CONTROLLER

[75] Inventor: R. Stephen Boswell, Fridley, Minn.

[73] Assignee: Unisys Corporation, Blue Bell, Pa.

[21] Appl. No.: 231,547

[22] Filed: Apr. 22, 1994

[51] Int. Cl.$^6$ .................................................. G06F 15/00
[52] U.S. Cl. ............................................ 395/114; 395/115
[58] Field of Search ..................................... 395/101, 112, 395/114, 163, 111, 115, 116, 117, 164, 165, 166, 800; 358/402, 403, 407, 296, 404, 444; 355/200, 202, 204; 400/62, 70, 71; 347/142

[56] References Cited

U.S. PATENT DOCUMENTS

| | | | |
|---|---|---|---|
| 5,165,014 | 11/1992 | Vassar | 395/112 |
| 5,179,637 | 1/1993 | Nardozzi | 395/114 |
| 5,220,674 | 5/1993 | Morgan et al. | 395/800 |
| 5,227,643 | 7/1993 | Craig et al. | 250/566 |
| 5,228,118 | 7/1993 | Sasaki | 395/112 |
| 5,287,194 | 2/1994 | Lobiondo | 395/114 |
| 5,287,434 | 2/1994 | Bain et al. | 395/114 |
| 5,327,526 | 7/1994 | Nomura et al. | 395/115 |
| 5,345,091 | 9/1994 | Craig et al. | 250/566 |

OTHER PUBLICATIONS

Richard Hart, Jeff Parker, Jerold Sampson, "The Palladium Printing Model: A P1003.7 Working Paper", Nov. 1990.
"Spin–X Printing Solutions" Georgia State University Research Foundation, Inc., promotional materials.
"The DecPrint Architecture: Digital's Printing Architecture for the '90's" Digital Equipment Corporation promotional materials, 1991.
"Henry Forms" Teksouth Corporation promotional materials.
"Draft Standard for Information Technology–Portable Operating System Interface (POSIX) System Administration Interface/Printing", P1003.7.1/D5, Apr. 1992.
"Print (Almost) Anything Anywhere", Datamation, Sep. 15, 1992, pp. 83–84.
Nancy E. Wood "Automating Printers In Enterprise–Wide Networks", Unisphere, Nov. 1993, pp. 56–59.

Primary Examiner—Mark R. Powell
Assistant Examiner—Dov Popovici
Attorney, Agent, or Firm—Charles A. Johnson; Mark T. Starr

[57] ABSTRACT

A system and method for transferring and printing files originating on mainframe computer systems, workstations, or personal computers connected within a heterogeneous computer network is disclosed. The printer controller coordinates the distribution of print files across multiple computer systems to attached printers for printing. In response to incoming files received from another computer system within the network, the system utilizes file mask attributes to automatically generate transfer requests and print requests. In response to user inputs through a graphical user interface, the system updates various file databases, print attribute and transfer attribute libraries, and system configurations before generating a transfer or print request. Support for multiple page description languages and multiple printers is provided.

42 Claims, 37 Drawing Sheets

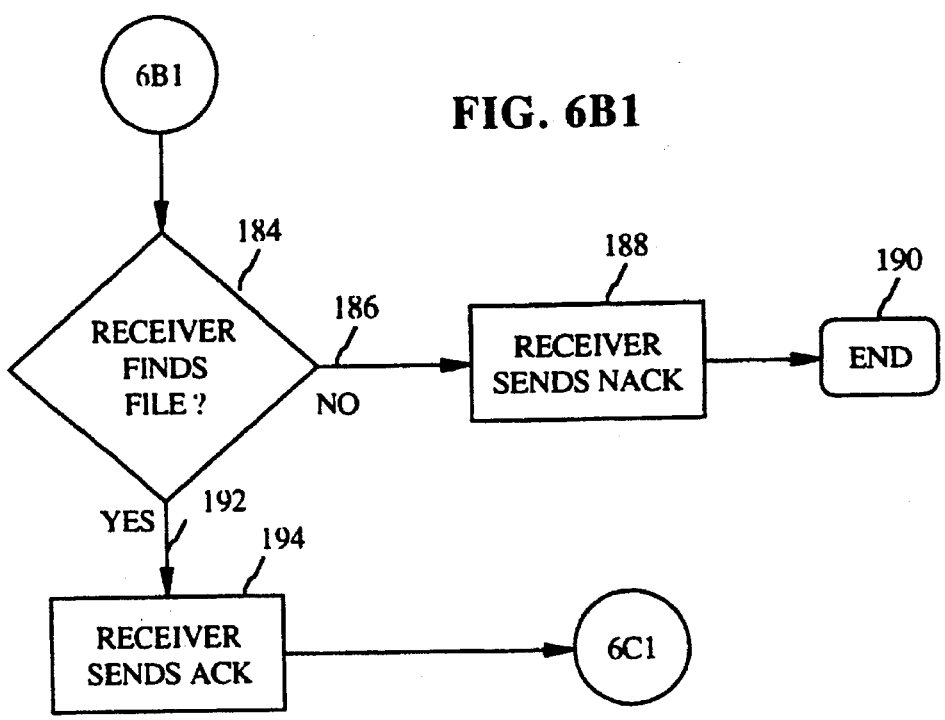
FIG. 6B1
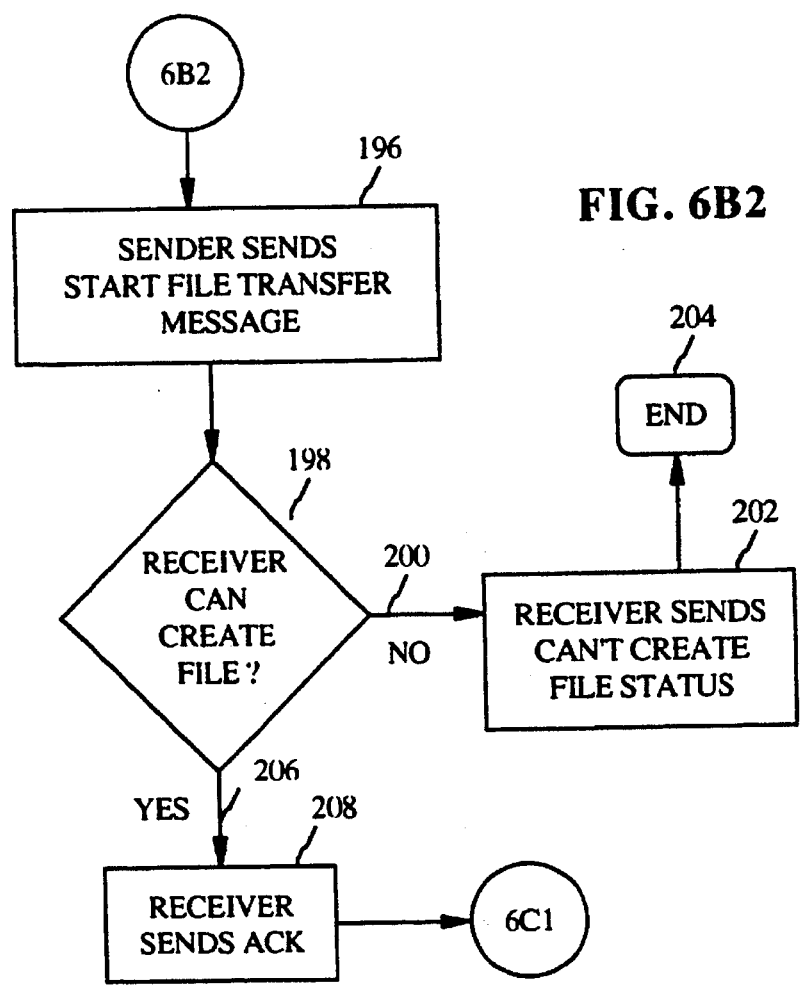
FIG. 6B2

| | | |
|---|---|---|
| ACQUIRE DATE — 298 | HOST PROJECT ID — 322 | REMOVE ON COMP — 346 |
| ACQUIRE TIME — 300 | HOST USER ID — 324 | DELETE ON REMOVAL — 348 |
| PC GROUP — 302 | HOST BANNER ID — 326 | PRINTER TYPE — 350 |
| PC PRIORITY — 304 | ESTIMATED PAGES — 328 | BACKUP TYPE — 352 |
| HOST QUEUE — 306 | TRANSPORT TYPE — 330 | BACKUP DATE — 354 |
| HOST PRIORITY — 308 | TRANSFER DATE — 332 | BACKUP TIME — 356 |
| HOST SYSTEM NAME — 310 | TRANSFER TIME — 334 | RECORD SIZE — 358 |
| HOST QUALIFIER — 312 | FILE TYPE — 336 | MOST RECENT PA — 360 |
| HOST FILE NAME — 314 | HOST ASG TIME — 338 | MOST RECENT PR — 362 |
| HOST F CYCLE — 316 | HOST ASG DATE — 340 | CHECKED BY — 364 |
| HOST RUN ID — 318 | PRINT FILE NAME — 342 | |
| HOST ACCOUNT NUMBER — 320 | REMOVE DAYS — 344 | |

FIG. 8

Communications Configuration

Available Paths:
- rcv-all1
- rcv-all2
- rcv-all3
- rcv-lpd1
- rcv-lpd2

Server Limits:
- Activities: 0
- Block Size: 512

Client Limits:
- Activities: 0
- Block Size: 512
- Msgs per Ack: 8

Peer Type: 2200/A-Series
Max Total Activities: 0

Save
Done

File Group Definition

- DEFAULT contains 0 file(s) -

File Disposition Options:

Remove File from DEPCON
- ○ On completion of all jobs
- ● After `0` days, `6` hrs

Delete File
- ☒ Upon removal from DEPCON

Group Priority: `M`

Comments:
DEFAULT file group

Group Print Hold Directory (optional):

☒ Set Read-Only For Print File

[ Add ]   [ Modify ]   [ Delete ]   [ Done ]

File Group:
- DEFAULT
- ERRGROUP

Modify Print Attribute: DEFAULT - Hardware Dependent

Printer Type: UHS/7050

Coded Char Set:

Page Size: Letter 8.5 x 11 in

Char Size Adjust: 1.00 (pts)

Chars / Inch:

Page Margins
- Top: 0.25 (Inches)
- Bottom: 0.25 (Inches)
- Left: 0.00 (Inches)
- Right: 0.00 (Inches)
- Binding: 0.00 (Inches)

Print Quality
- ○ Draft
- ○ DP
- ● Letter

Orientation
- ● Portrait
- ○ Landscape

Input Paper Bin
- ○ Upper
- ○ Middle
- ○ Lower
- ○ Manual
- ● No Change

Output Paper Bin
- ○ Tray 1
- ○ Tray 2
- ○ Sample
- ● No Change

Multiple Ups: 1

Simplex/Duplex
- ○ Simplex
- ○ Duplex - Long edge binding
- ○ Duplex - Short edge binding
- ● No Change OK   Cancel

| Printer Translate Table DEFAULT | | | | | | | | | | | | | | | | |
|---|---|---|---|---|---|---|---|---|---|---|---|---|---|---|---|---|
|  | 0 | 1 | 2 | 3 | 4 | 5 | 6 | 7 | 8 | 9 | A | B | C | D | E | F |
| 00 | 00 | 01 | 02 | 03 | 04 | 05 | 06 | 07 | 08 | 09 | 0A | 0B | 0C | 0D | 0E | 0F |
| 10 | 10 | 11 | 12 | 13 | 14 | 15 | 16 | 17 | 18 | 19 | 1A | 1B | 1C | 1D | 1E | 1F |
| 20 | 20 | 21 | 22 | 23 | 24 | 25 | 26 | 27 | 28 | 29 | 2A | 2B | 2C | 2D | 2E | 2F |
| 30 | 30 | 31 | 32 | 33 | 34 | 35 | 36 | 37 | 38 | 39 | 3A | 3B | 3C | 3D | 3E | 3F |

[ OK ]
[ Cancel ]

● 0Oh-3Fh
○ 40h-7Fh
○ 80h-BFh
○ C0h-FFh

388

Header/Trailer Page Configuration

Definition Name: HDEFAULT

Items:
- Backup Date
- Backup Time
- Backup Type
- Bottom Margin
- Chars/Line
- Checked By
- Data File Name
- DEPCON Level

| Line(s) | Item Name | Data | Prefix | Ovfl | Position | Size |
|---|---|---|---|---|---|---|
| T1 | Sequence Nums | Y | N | | LJ Full Width | 1 x 1 |
| T2 | Sequence Nums | Y | N | | LJ Full Width | 1 x 1 |
| T3 | Sequence Nums | Y | N | | LJ Full Width | 1 x 1 |
| T4 | Sequence Nums | Y | N | | LJ Full Width | 1 x 1 |
| T5 | File Seq Num | Y | Y | | RJ Full Width | 1 x 1 |
| T10-21 | Host Bannerid | Y | N | | Center | 12 x 12 |
| T29 | DEPCON Level | Y | Y | | Center | 1 x 1 |
| T31 | Printer Id | Y | Y | | Center | 1 x 1 |
| T32 | Printer Type | Y | N | | Center | 1 x 1 |
| T35 | User Line 1 | Y | N | | LJ Full Width | 1 x 1 |
| T36 | Host System | Y | N | | Column 3 | 1 x 1 |
| T36 | Host Runid | Y | N | | Column 16 | 1 x 1 |
| T36 | Host Userid | Y | N | | Column 25 | 1 x 1 |
| T36 | Host Account | Y | N | | Column 39 | 1 x 1 |
| T36 | Host Project | Y | N | | Column 53 | 1 x 1 |

Chars per Line: 132
Lines per Page: 88

[Add Definition] [Save Definition] [Delete Definition] [Done]

DISTRIBUTED ENTERPRISE PRINT CONTROLLER

BACKGROUND OF THE INVENTION

1. Field of the Invention

This invention relates generally to digital data processing systems and more specifically to a distributed print controller that transfers files between mainframe computer systems and personal computer systems and prints files on printers connected to a mainframe computer system or personal computer system by a computer network.

2. Background Information

Most digital computer systems include at least one printing system to produce printed records of data that have been generated by the computer system. A typical printing system contained in early computer architectures consisted of a single, stand-alone printer designed to sequentially accept printing requests from the computer system it is connected to, and to process these requests to produce a printed paper copy of the information generated by the computer system. The printer may have had a small memory to store the control information necessary to process the print requests. The typical system had a printer connected by a cable to an Input/Output (I/O) bus of the computer system. An application program executed on the computer system to produce an output file stored in the computer system's memory. This memory consisted of random-access-memory (RAM) or secondary mass storage devices such as magnetic disks. A computer operator inputted a command via the main console of the computer system to print the output file on the attached printer. The operating system of the computer system initiated the print requests to direct the printer to print the characters contained in the output file on paper. This scheme was very restrictive in that it was highly dependent on the speed of the printer and the overall processing load of the computer system, and only supported one type of print job at a time.

As computer systems grew larger, faster, and more complex, this "one computer to one printer" design quickly became obsolete. Instead, printing systems were developed to take advantage of increased processor speed and greater disk capacity of new computer systems. This next generation of printing systems used multiple printers connected to multiple print queues supported by the computer system. In this type of system, the application program generated an output file as before. However, the computer operator had several options on how to print the output file because of the presence of multiple printers and the print queues. In the memory of the computer system, one or more print queues were defined to represent not physical, but logical printers. In this computer system, the memory usually consisted of magnetic disks. A print queue is a list of print jobs with similar attributes to be printed on a particular physical printer. Print attributes may consist of physical printer identifier, print job priority, print disposition, and a print format number. By specifying this small set of print attributes, a computer operator or other user could control the printing of multiple jobs. In such a system, all printers were still connected directly to the computer system via cables. Because of the physical characteristics of the wire cables, the maximum distance that printers could be located from the computer system was about 250 feet. Thus, printers had to be located close to the computer system, and often were in the same room.

A significant limitation on the flexibility of using print queues is that the definition of a print queue is static. In order to install a new print queue or modify an existing print queue, a system administrator must take the computer system off-line, edit the operating system-resident printer configuration information, and possibly reboot the computer system. These steps could take from 15 minutes to one hour, which often is unacceptable in many system environments.

Both of the computer systems described above could be classified as "print then distribute" systems. The computer systems generally were large mainframe computers connected to multiple printers, all centrally located in a data processing center. The operation of the computer system and the attached printers was labor intensive. Computer operators had to input print commands, frequently change printer paper and forms, and monitor print operations. Once an output file was printed, the data processing center staff had to separate the printouts, identify the user or owner of the printouts, and physically distribute the paper output to the users. There often was a significant time delay from the time a user requested a file to be printed to the time the user received the output at his/her desk.

The model of multiple print queues feeding multiple hard-wired printers from a mainframe computer system no longer adequately matches current computer system architectures. In a modern client/server system of networked computers, there may be no central computer system that controls all printers in the network. Furthermore, different print jobs may be represented in different formats. As well as simple textual information, there now exists different printer control languages such as POSTSCRIPT and PCL. First come, first serve priorities may not be the most efficient use of a complex printer. Many printers can select paper trays or download fonts. Often there is a set-up time for any changes to a printer's configuration. To maximize throughput, the system may process similar print jobs in succession, rather than processing print jobs in the order they arrive. In sum, printing capabilities of computer systems have evolved considerably over the years. The evolution has been driven by the emergence of distributed network computing and compound documents. Business solutions often require global access to printed documents that contain text, images, and graphic information. Users now want computer systems to be able to print documents, produced from a variety of operating systems, from locations anywhere in a heterogeneous computer network. Instead of one printer connected directly to the computer system, printers are now locally and remotely connected to local area networks (LANs), personal computers (PCs), workstations, and terminals across different network protocols such as the standard Transmission Control Protocol/Internet Protocol (TCP/IP), DECNET (available from Digital Equipment Corporation), APPLE-TALK (available from Apple Computer, Inc.), and others.

To better serve users in a networked computer environment, new computer systems providing printing services could be "distribute then print" systems. That is, a user could be able to control the printing of a print job on any printer connected to the network. The print job could be distributed to a selected printer with the desired capabilities at a location near to the user and then printed. The availability of small, fast, remote printers provides the opportunity to lower distribution costs, decrease the cost per page of print output, and improve the distribution time of print jobs. Although such systems are data communications intensive, they can use existing printing hardware, provide support for the existing communications network environment, and allow remote operator control of print jobs. The decentralized nature of the distributed print controller model maximizes overall system efficiency for printing services.

There presently exist various solutions to the distributed printing problem. One approach is to transfer the output file from a mainframe computer system (also known as an enterprise server) to a PC over a network, store it on the PC, and then transfer it from the PC through a LAN to a printer, all by operator commands. However, the throughput for this method is too small and is limited by the main memory and disk size and processing speed of the PC. Additionally, the transfer from the mainframe to the PC and from the PC through the network to the printer consists of two manual steps that must be performed by the user.

Another approach is to use terminal emulation mode on a PC. Under this method, the output file is displayed on a computer terminal one page at a time. Each page is then dumped to an attached printer by manual or automated command. It is possible to bypass the screen display, but the overall operation is still too slow and undependable. Many times print data is duplicated and errors occur in the printed output. In addition, both of these approaches are point-to-point solutions. They do not support a switched or multi-point capability whereby print jobs can be distributed to many printers concurrently.

Several products exist which enable networks to route any document from any connected computer system to any printer. The Advanced Function Printing (AFP) system from International Business Machines (IBM), is the distributed printing component of IBM's Systems Application Architecture (SAA). It handles print resource management, control and production for documents produced by AFP-supporting applications and printing on AFP-compatible printers. Although AFP is a published standard, since the IBM system uses Intelligent Printer DataStream (IPDS), a proprietary page description language which is printer dependent, AFP is limited in its applicability to computer systems and printers produced by other vendors. More specifically, costly reprogramming of existing print formats is required in order to take advantage of the AFP system.

Novell, Inc. provides print distribution services in some of its networking products but these products do not provide users with sufficient control over printing and transferring files. Novell's systems require a user application program to compose the file to be printed in an selected Printer Description Language (PDL). Once the print file is composed, the file cannot then be printed on a printer that uses a different PDL. This severely limits the flexibility of Novell's systems in providing users control over where files may be printed.

Therefore, an improved distributed printing system is needed that provides users with greater flexibility and control in transferring and printing files within a distributed computer network consisting of many different computer systems and printers.

SUMMARY OF THE INVENTION

An object of this invention is to provide a distributed printing system for multiple computer systems which supports industry-standard page description languages, heterogeneous computer networks and associated communications protocols, and a variety of types of printers.

Another object of this invention is improve the centralized management of print resources within a network of computer systems while providing users with flexible control of the routing of print files.

Still another object of this invention is to print files originating from an enterprise server on any printer connected to a personal computer or another enterprise server which are part of the same heterogeneous computer network as the enterprise server.

Yet another object of this invention is to transfer files originating on an enterprise server to a personal computer or another enterprise server which are part of the same heterogeneous computer network as the enterprise server.

Another object of this invention is to print files originating from a personal computer on any printer connected to an enterprise server or another personal computer which are part of the same heterogeneous communications network as the personal computer.

A further object of this invention is to transfer files originating on a personal computer to a enterprise server or another personal computer which are part of the same heterogeneous computer network as the personal computer.

Another object of this invention is to support the placing of files originating on an enterprise server or a personal computer on a computer network print queue.

Still another object of the present invention is to support either remote or centralized printing environments for multiple computer systems connected together by a computer network.

Yet another object of the present invention is to provide users of personal computers and enterprise servers which are connected by a computer network the capability to control when, where and how print files are to be printed within the network.

A further object of the present invention is to allow users to modify print file attributes to control when, where, and how print files are to be printed on any one of many available printers of different types and capabilities which are connected to a computer network.

Yet another object of this invention is to provide users of a distributed printing system a flexible, user-friendly graphical user interface for controlling the distribution and printing of print files in a heterogeneous communications network containing multiple PCs and mainframe computer systems.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the Drawings and Description of the Preferred Embodiment, with the scope and aspects of the invention defined in the appended claims.

According to the present invention, the foregoing and other objects and advantages are attained by a distributed printing control system which manages the transferring and printing of files originating on mainframe computer systems or personal computers connected within a heterogeneous computer network. The system coordinates the distribution of print files across multiple computer systems to printers attached to the computer systems. In response to incoming print files received from other computer systems in the network, the system uses file mask attribute information contained in a header to each file to automatically generate transfer requests and print requests. In response to user requests received through a graphical user interface, the system updates various file databases, a file mask library, and print attribute and transfer attribute libraries.

in accordance with an aspect of this invention, a distributed printing control system for transferring files between computer systems connected by a network and printing files on attached computer printers is provided. A file database is included for storage and retrieval of files, each file containing a file mask consisting of file identification information, transfer attributes, and print attributes. A file mask processing function compares a file mask against a set of file masks from the file database, creating a transfer job to transfer the file or a print job to print the file depending on the attributes specified in a matched file mask. A file transfer component executes the transfer job to transfer the file to another computer system as required. A file print component executes the print job to print the file on a selected computer printer.

In accordance with another aspect of the invention, a method of transferring files between computer systems connected by a computer network and printing files on computer printers coupled to the computer systems, each of the files having an embedded file mask specifying file identification information, transfer attributes, and print attributes is disclosed. A file mask embedded within a file is compared to a library of file masks. A print job is created for selectively printing the file on a printer when the file mask contains print attributes. A transfer job is created for selectively transferring the file to another computer system in the network when the file mask contains transfer attributes. Finally, the print job, the transfer job, or both are performed to print and transfer the file.

Still other objects and advantages of the present invention will become readily apparent to those skilled in the art from the following detailed description, wherein is shown and described only the preferred embodiment of the invention, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive, and what is intended to be protected by Letters Patent is set forth in the appended claims.

BRIEF DESCRIPTION OF THE DRAWINGS

FIGS. 6A through 6D are flow charts representing the mainframe/PC transfer protocol.

FIG. 8 is a table showing the data elements stored in an entry of the File Database.

FIG. 10 is a diagram of the Communications Configuration attributes.

FIG. 11 is a diagram illustrating File Mask Library entry attributes.

FIG. 12 is a diagram of a File Group Library entry definition.

FIG. 15 is a diagram showing the hardware-dependent Print Attribute Library values that may be modified by the user.

FIG. 20 is a diagram showing the default Translate Table.

FIG. 22 is a diagram showing an example of the Header/Trailer Page Configuration.

DESCRIPTION OF THE PREFERRED EMBODIMENT

Figure 1:
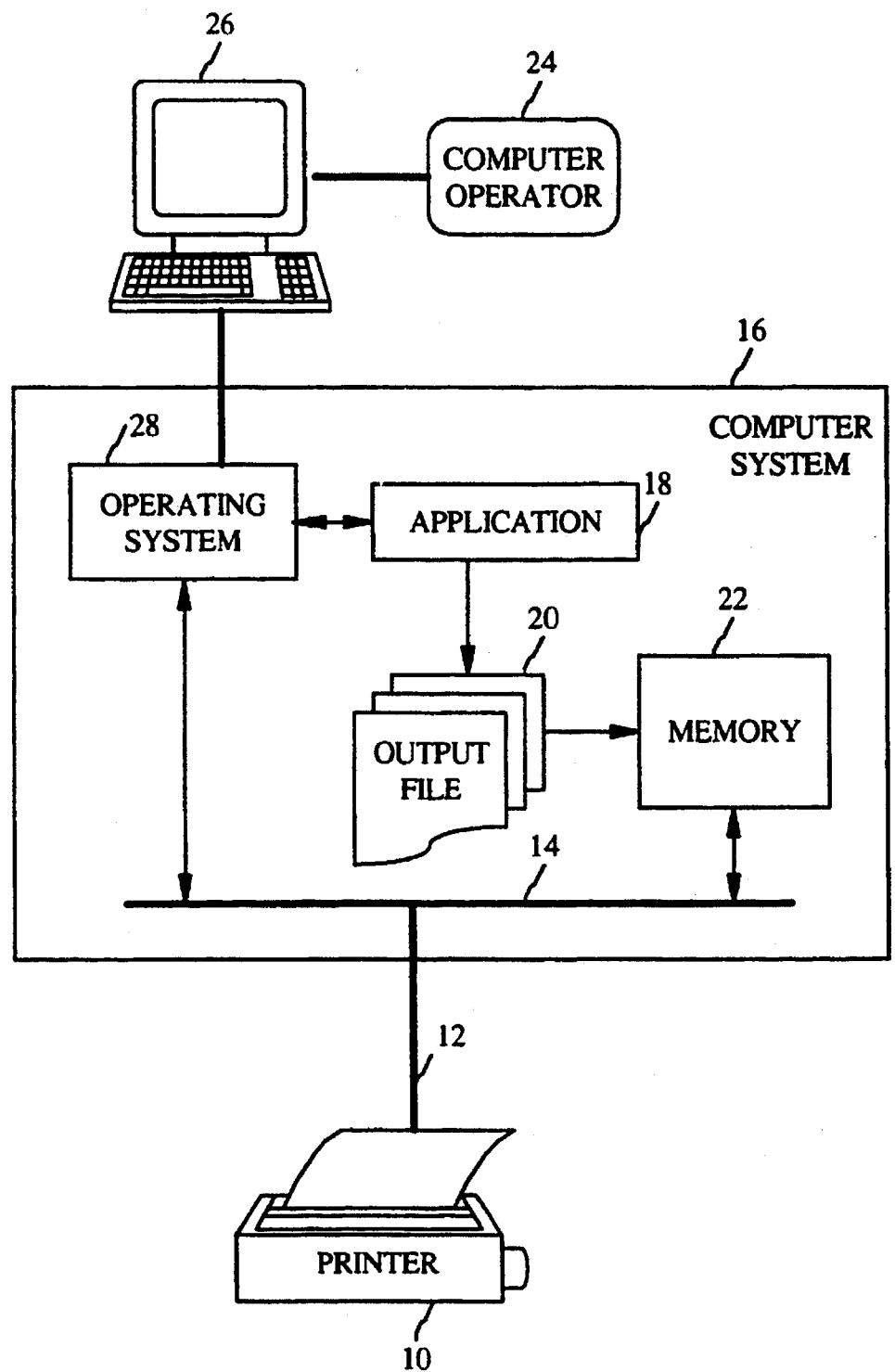
FIG. 1 is a block diagram that shows a prior art system where a single printer is connected by a wire cable to the internal I/O bus of a computer system.

FIG. 1 is a block diagram that shows a prior art system where a single Printer 10 is connected by a wire Cable 12 to the internal Input/Output (I/O) Bus 14 of a Computer System 16. An Application computer program 18 executes on the Computer System 16 to produce an Output File 20 stored in Memory 22. Memory 22 consisted of either random-access-memory (RAM) or a secondary mass storage device such as magnetic disk. A Computer Operator 24 then inputs a command via Main Console 26 and Operating System software 28 of the Computer System to print the Output File on the attached Printer 10. The Operating System (OS) software 28, as part of its processing load, initiates print requests to direct the Printer 10 to print the characters contained in the Output File 20 on paper. This scheme was very restrictive in that it was highly dependent on the speed of the Printer 10 and the overall processing load of the Computer System 16, and only supported one type of print job at a time.

Figure 2:
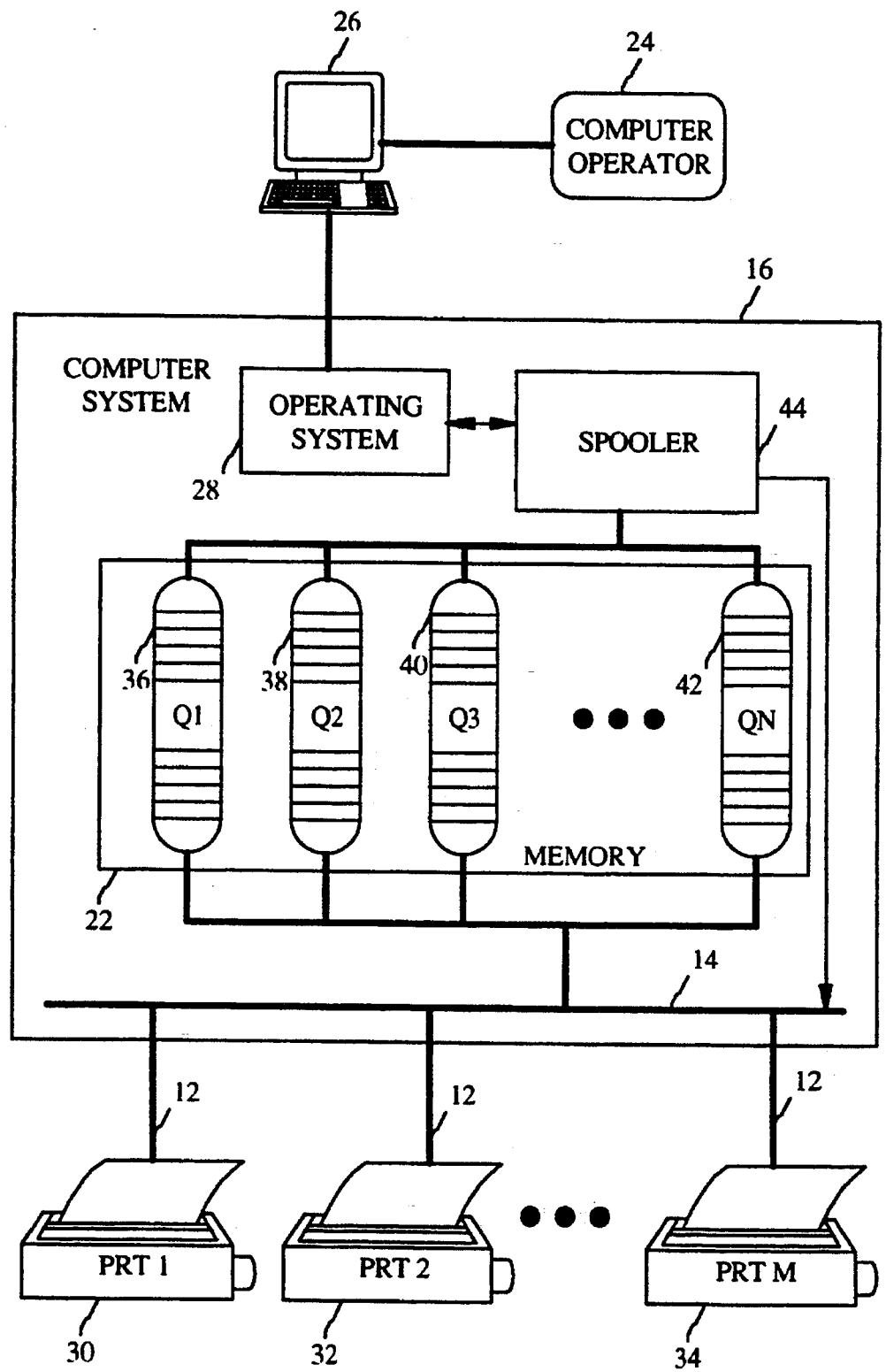
FIG. 2 is a block diagram that shows another prior art system where multiple printers are connected to a computer system containing multiple print queues.

FIG. 2 is a block diagram that shows another prior art system where multiple Printers PRT 1, PRT 2, . . . PRT M, labelled 30, 32, . . . 34, respectively, are connected to a Computer System 16 containing multiple Print Queues Q1, Q2, Q3, . . . QN, labelled 36, 38, 40, . . . 42, respectively. In this system, the Application program (not shown) generates an Output File (not shown) as before. However, the Computer Operator 24 now has several options on how to print the Output File because of the presence of multiple Printers and the Print Queues. In the Memory 22 of the Computer System 16, one or more Print Queues are defined to represent not physical, but logical printers. In this Computer System 16, the Memory 22 typically consisted of magnetic disks. A Print Queue is a list of print jobs with similar attributes to be printed on a particular physical printer. Print attributes may consist of physical printer identifier, print job priority, print disposition, and a print format number. By specifying this small set of print attributes, a Computer Operator 24 or other user controls the printing of multiple print jobs. In such a system, all Printers are still connected directly to the Computer System via Cables 12. Because of the physical characteristics of the wire Cables, the maximum distance that Printers can be located from the Computer System is about 250 feet. Thus, Printers must be located close to the Computer System, and often are in the same room.

To accommodate the increased number of printers attached to the system, a special purpose program called a Spooler 44 was designed to execute periodically in the Computer System 16 to manage the flow of data from the Computer System's Memory 22 to the Printers PRT 1, PRT 2, . . . PRT M, labelled 30, 32, . . . 34, respectively. Traditionally, spoolers mediate between system components of different speeds, allowing a fast computer system to queue print jobs to a slow printer. The central Computer System 16 enqueues jobs in Memory 22, and notifies the Spooler 44. The Spooler initiates a task to print the job and to supervise printing. The Spooler 44 acts as a queue manager, allowing the OS 28 of the Computer System 16 to store print jobs waiting for further processing while other print jobs are being printed.

Originally, print spoolers were designed for time-sharing systems. In these systems, printers were simply another resource that the Operating System 28 allocated and attended to as needed. Printers themselves were quite simple: most had a single font and a single paper size. Users chose a printer based on location or printer name, and the implementation of the user's print command spooled the print job to the selected printer. The format of a print job was also simple. It was a string of characters, demarcated by control characters such as commands to start a new line or form feed. Users also had a simple mental model of a print queue. They expected their jobs to be printed before any job of equal priority which was submitted later in time.

I. System Overview

The Distributed Enterprise Print Controller (DEPCON) is a peer-to-peer distributed system which handles print job flow between mainframe computer systems, PCs, workstations, and LAN print queues. In the preferred embodiment, the mainframe computer systems are 1100/2200 Series computers, available from Unisys Corporation, and the LAN is available from Novell, Incorporated. The PC components of the system may be IBM ATs, or other 286, 386, 486, or PENTIUM processor (available from Intel Corporation) personal computer systems having similar characteristics as a stand-alone unit. The workstations execute the UNIX operating system. For discussion purposes, the term PC used hereinafter is to include workstations. DEPCON supports either remote or centralized printing environments, communicates with many different printer types attached to PCs on the LAN, and allows users to share specialized printers with other users. The system allows users to preview print files and print selected pages of print files. In addition, it provides a simple access to print servers produced by Novell, Inc.

DEPCON provides many functions for users to print or transfer print files within the system. The system allows users operating on a mainframe computer system to print files on a printer connected to a PC via a LAN. Users can also simply transfer print files from a mainframe to a PC. Similarly, users operating on a PC can print files on a printer connected to a mainframe, and transfer files from the PC to the mainframe. Transfers between mainframes or between PCs is also supported.

The environment in which this system operates is composed of multiple computer systems and communications networks. The DEPCON system in the preferred embodiment executes on multiple microprocessor-based PCs and 1100/2200 Series and A-Series mainframes, although the concepts embodied in this invention could be used with other large mainframe computer systems and other types of PCs. Communication between mainframes and PCs is accomplished through a Transport Service Access Method (TSAM) interface contained in the Communications Management System (CMS) 1100 and a related communications system produced by DCA/ICC called INFOCONNECT, both of which are computer programs commercially available from Unisys Corporation. INFOCONNECT uses TCP/IP as its communications protocol. By using peer-to-peer protocols, print files can be distributed between any PCs and any mainframes in the DEPCON system. Print jobs can originate on either mainframes or PCs. The DEPCON system supports 1100/2200 Series System Data Format (SDF) files, pass-through files that are already formatted for a particular printer, and American Standard Code for Information Interchange (ASCII) text files. The system also supports command files that allow users to specify many printer control functions such as switching fonts and printing forms overlays. The system gives system administrators control over the flow of print files within the network. DEPCON controls the destination of print files within the network, how the print files get to their assigned destination, and when the print files are to be transferred.

Figure 3:
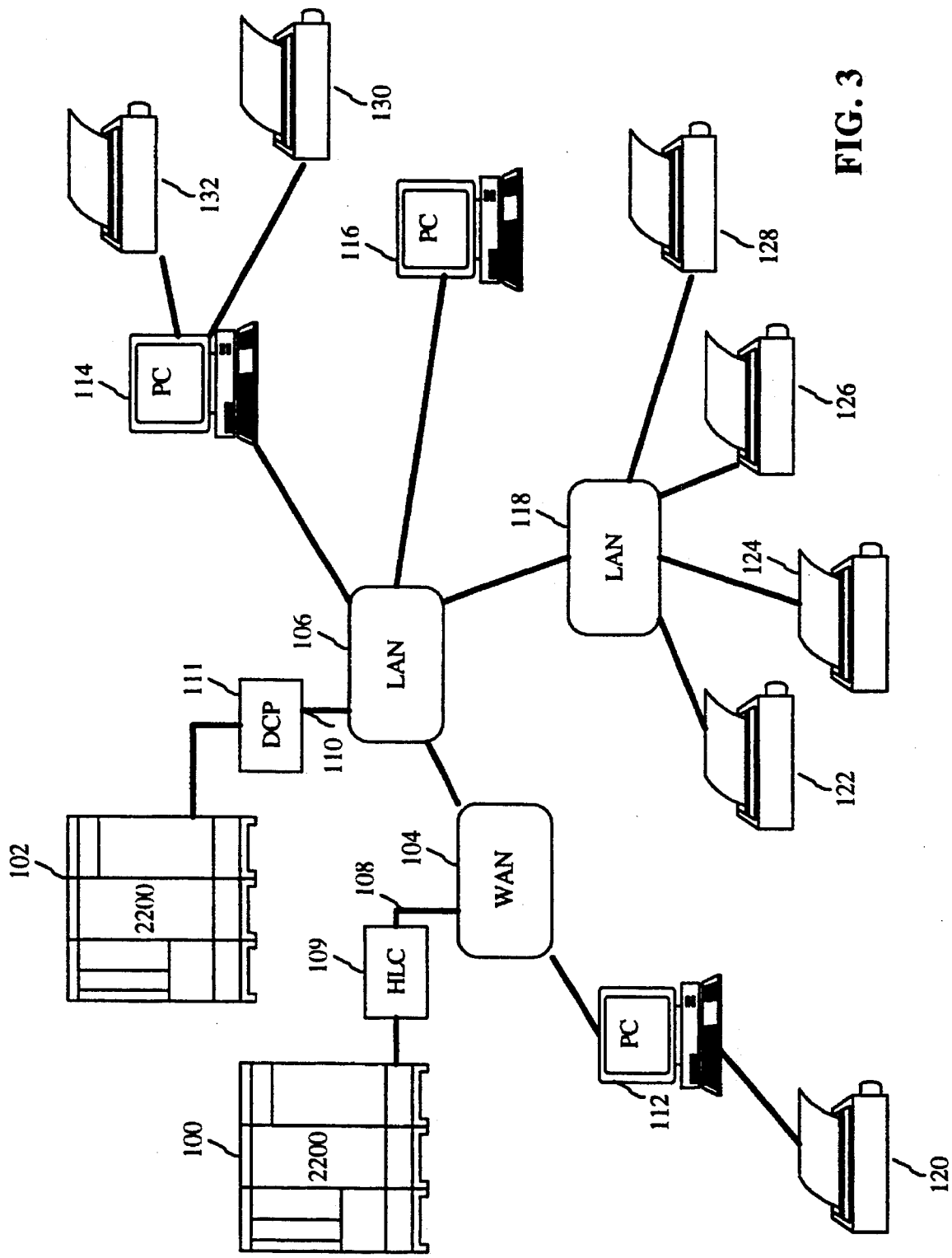
FIG. 3 is a diagram showing a sample network architecture utilizing the present invention.

FIG. 3 is a diagram showing a sample network architecture utilizing the present invention. One or more large mainframe systems 100, 102 are coupled to a Wide-Area-Network (WAN) 104, or a LAN 106, over Lines 108, 110, respectively. A LAN is a private communications network with a limited geographical range, typically a single building or campus. Individual computers attach to a LAN to communicate with each other. Protocols are typically handled by the individual processors attached to the LAN. In contrast, a WAN's geographical range is greater than a LAN. A WAN may stretch across a metropolitan area or beyond. The LAN 106 and WAN 104 may be implemented with Novell NETWARE networks or similar well known embodiments. The communication Lines 108, 110 connecting mainframes to networks in the system may consist of a Host LAN Controller (HLC) 109 or a Distributed Communication Processor (DCP) 111. A HLC 109 is a specialized control unit that connects a computer system executing the OS 1100 operating system (available from Unisys Corporation) to an Institute of Electrical and Electronic Engineers (IEEE) 802.3 standard or Ethernet LAN. A DCP 111 is a special-purpose computer designed exclusively for communications applications. The DCP is used as a front-end processor for computers running the OS 1100 operating system, or to interconnect networks of OS 1100 computers and other machines. A DCP can function as a remote concentrator, a message-switch (nodal) processor, or a front-end processor. The WAN 104 and LAN 106 may be connected to multiple PCs 112, 114, 116 or other LANs 118. These interconnections may be by physical cables or by other communications links such as modems. Finally, multiple printers 120, 122, 124, 126, 128, 130, and 132, are coupled to the network nodes as shown. It should be understood that FIG. 3 is merely an illustrative example of a supported architecture. The number of mainframes, PCs, LANs, WANs, and printers supported by the present invention may vary and is not intended to be limited by FIG. 3.

II. System Communications Architecture

Figure 4:
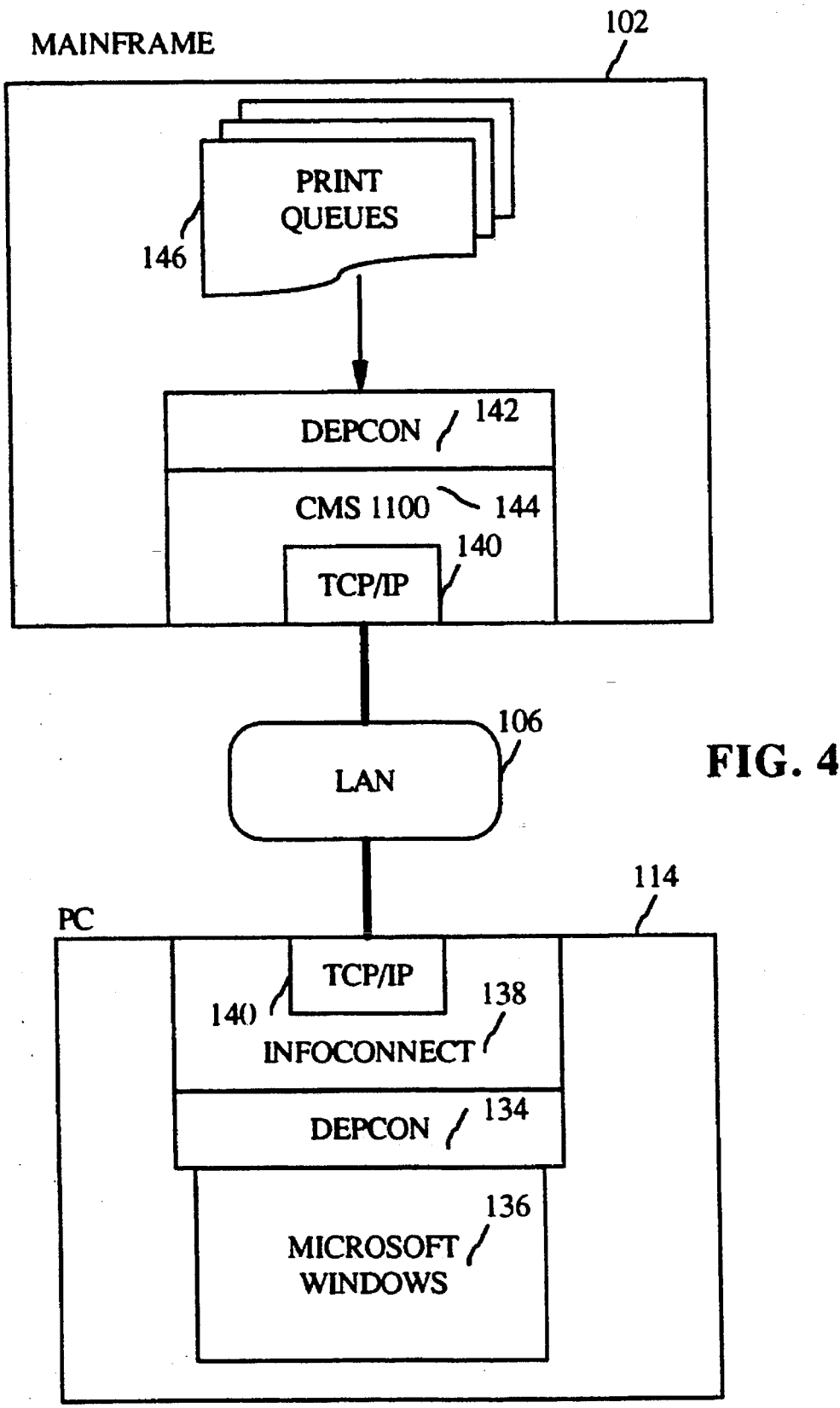
FIG. 4 is a diagram illustrating the two Distributed Enterprise Print Controller components.

FIG. 4 is a diagram illustrating the two Distributed Enterprise Print Controller components. The DEPCON PC component 134 executes on a PC 114. The PC component 134 exists in the preferred embodiment as a set of computer programs running under Microsoft Corporation's WINDOWS operating system 136, although other operating systems could also be used. The DEPCON PC component 134 handles print file transfer, administration, and printing functions. It supports many different types of commercially available printers, including most POSTSCRIPT, PCL, Unisys 9246, Epson, ASCII text, and IBM PROPRINTER printers. It provides access to Novell LAN print queues for a user's print jobs. It also acts as a gateway to many Novell print servers at any one time. The DEPCON PC component 134 contains a file viewer that allows a user to preview print files, perform searches on files, copy portions of a print file to a WINDOWS clipboard, and print some or all of a file. It also provides control over the use of different fonts and forms overlays. Critical to the DEPCON PC component's functionality is the control of print jobs based on file characteristics, which will be discussed in greater detail below. Print jobs can be routed to different places or printed differently based on characteristics such as the origin of the file, the size of the file, or the user who created the print job. Additional functions of the DEPCON PC component include providing custom header and trailer pages for print files, and logging of records for cost accounting, print job tracking, or statistical reports. The DEPCON PC component 134 communicates with a LAN 106 via INFOCONNECT software 138 and TCP/IP network software 140. Examples of suitable commercially available TCP/IP network software 140 include LAN WORKPLACE from Novell, Inc., and PC/TCP from FTP Software, Inc.

The DEPCON PC component 134 communicates through LAN 106 to the DEPCON mainframe component 142 executing on a Mainframe computer system 102. The DEPCON mainframe component 142 communicates with the LAN via CMS 1100 communications software 144 and TCP/IP network software 140. The DEPCON mainframe component is a batch job executing in the background on the mainframe's processor. It takes as input the print jobs contained in the mainframe's print queues 146. It routes print jobs to their destination in the network, accepts print jobs from other mainframes and PCs, and places print jobs on mainframe print queues. The DEPCON mainframe component 142 routes print jobs to PCs or other mainframes based on user identifier, account number, and other file attributes. It updates a log of all file transfers and provides for checkpointed recovery of mainframe-to-mainframe file transfers. It also moves print files between print queues on the same mainframe, using file characteristics to determine file destinations. When a print file is retrieved from a print queue that DEPCON is monitoring, queue entry and file information are recorded. The print file's characteristics (including file type such as SDF, ASCII, or pass-through) are also recorded.

Figure 5:
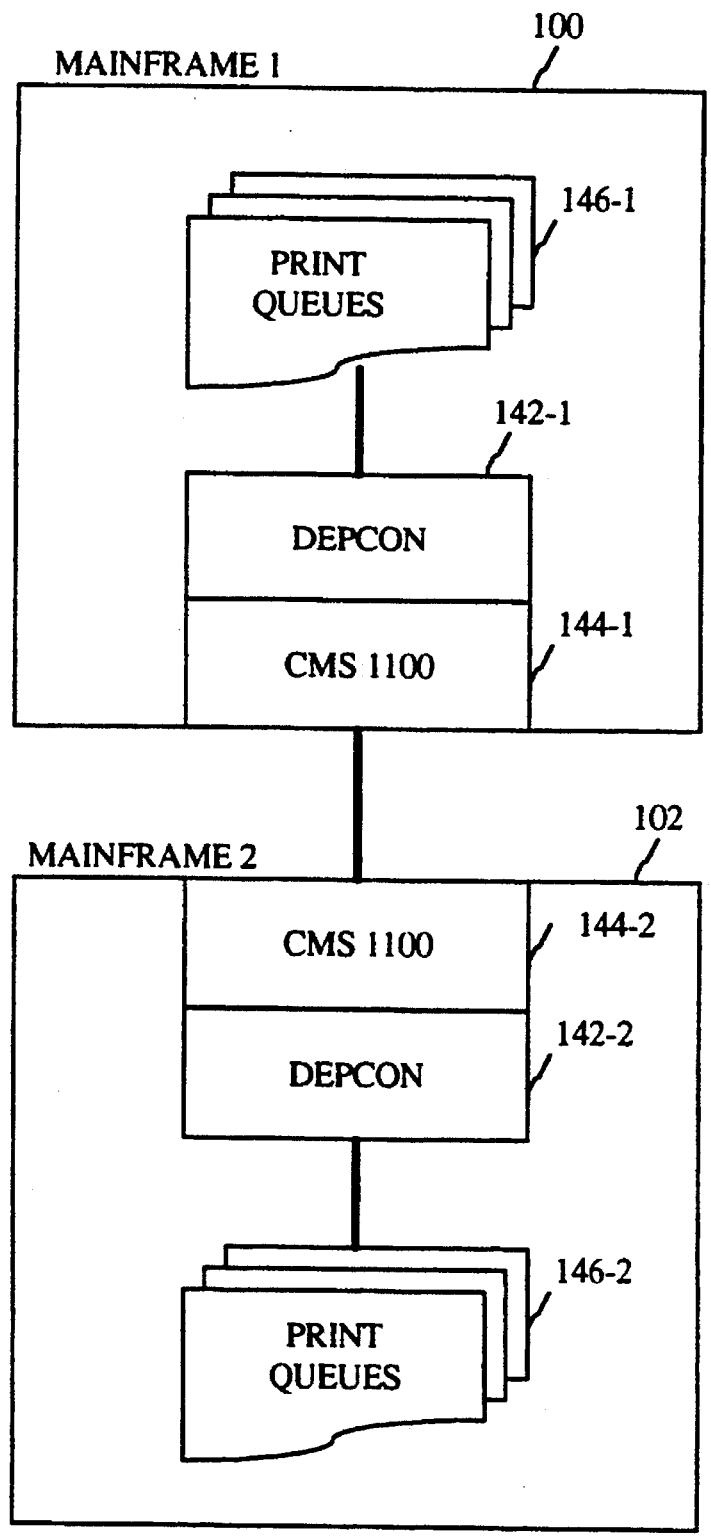
FIG. 5 is a diagram illustrating the mainframe-to-mainframe communications path for the Distributed Enterprise Print Controller.

FIG. 5 shows a mainframe-to-mainframe communications path for the Distributed Enterprise Print Controller. Mainframe 1 100 contains local Print Queues 146-1 and a mainframe component of DEPCON 142-1. Mainframe 2 102 also contains local Print Queues 146-2 and a mainframe component of DEPCON 142-2. The interface for mainframe-to-mainframe communications consists of the DEPCON 142-1, DEPCON 142-2, and CMS 1100 connections, labelled 144-1 and 144-2. This architecture is used for transferring print jobs from a print queue on one mainframe to a print queue on another mainframe. When the DEPCON mainframe component picks up a print file from a mainframe print queue that is destined for another mainframe, it uses its CMS 1100 144 software to send the print file to the other computer system. When the print file arrives on the other mainframe, CMS 1100 144 running on this second mainframe gives the file and information about its intended print queue to the second mainframe's DEPCON component. This mainframe component places the print file on the correct print queue. If the specified queue does not exist, the component reports an error to a computer operator (not shown). Once the print file is placed on the second mainframe's print queue, the DEPCON mainframe component can route it again to another destination in the network, or the file can remain on the print queue to be printed by one of the printers directly connected to the mainframe.

The primary commands to the DEPCON mainframe component are the SEND and MOVE commands. These commands are inputted by the user to route a print file to various print queues on the same mainframe or to other systems as described above. The SEND command parameters include which print queue's print files to send, the primary destination system or print queue, an alternate destination system or print queue, and a day and time when the primary and alternate paths are to be used. The MOVE command parameters include which print queue's print files to move, a destination print queue, a flag to delete the print file, and a flag to hold (i.e., retain) the print file in a designated holding file. Masking fields are used to determine which print files to move. Mask values include user account identifier, banner, file, pages greater than, pages less than, project identifier, run identifier, and user identifier. The masking character "%" is used to match any subsequent characters, and the masking character "?" is used to match any single character. The foregoing general description will be explained in more detail below.

III. System File Transfer Protocol

FIG. 6A through 6D are flow charts representing the mainframe/PC transfer protocol. Processing for transferring file and status information between mainframes and PCs begins at Start Step 148. Initially, the receiving system is in a listening state, waiting for a data transfer request from a sending system. When the sender is ready to transfer a file, it sends an initialization message to the receiver at Step 150. This message establishes a communication link between the sender and the receiver. If the receiver verifies that it is allowed to accept transfers from the sender, the receiver sends an initialization acknowledgment at Step 152. No reply is given if the sender is unauthorized to communicate with the receiver. The sender, at Step 154, sends a request to open a new activity to the receiver. This request contains information about the sending system, including the maximum block size the sender can service and a destination queue. The receiver determines the highest common block size for the communication and sends this information, along with other information about the receiver, back to the sender with an open activity acknowledgment (Step 156). The receiver checks to determine if the specified destination queue exists on the receiving system at Test Step 158. If the destination queue does not exist, the receiver's processing takes the No path 160 and replies with a queue not configured status message at Step 162. Transfer processing is then terminated at End Step 164.

If the destination queue does exist, Yes path 166 is taken. The receiver checks at Test Step 168 to determine if the file to be transferred is too large to be stored on the receiving system. If the file is too large, then the Yes path 170 is taken to Step 172. The receiver sends a file too large status message back to the sender and processing ends at End Step 164. If the file is not too large, No path 174 is taken.

File transfers between mainframes may be checkpointed in case of a loss of communication during a large transfer. If the sender wants to resume a previous transfer at Test Step 176, the Yes path 178 is taken and the sender sends a resume checkpointed transfer message at Step 180. This processing thread continues with the 6B1 connector on FIG. 6B1. If the sender cannot resume a previous transfer, the No path 182 is taken via the 6B2 connector and the processing thread continues on FIG. 6B2.

If a previous transfer is to be resumed, the receiver at Test Step 184 on FIG. 6B1 attempts to locate the designated file. If the file cannot be found on the receiving system, the No path 186 is taken and the receiver sends a negative acknowledgment (NACK) to the sender at Step 188, and processing ends at End Step 190. If the file is found, the Yes path 192 is taken and the receiver sends an acknowledgment to the sender at Step 194. Processing then continues on FIG. 6C via connector 6C1.

If the sender wants to transfer a file that does not require checkpoint recovery, it sends a start file transfer message to the receiver at Step 196. If the receiver is unable to create the file to hold the data transferred (Test Step 198), the No path 200 is taken and the receiver sends a can't create file status message back to the sender at Step 202. Processing then ends at End Step 204. If the file is created, Yes path 206 is taken and the receiver sends an acknowledgment back to the sender at Step 208. Processing continues on FIG. 6C via connector 6C1.

During the file transfer, the sender transfers data blocks of the size agreed upon, by sending a data block or data block with acknowledgment message at Step 210. Data block messages do not require an acknowledgment from the receiver, but data block with acknowledgment messages stop the flow of data until the receiver replies with an acknowledgment. Thus, the receiver determines at Test Step 212 whether an acknowledgment is required. If one is, the Yes path 214 is taken and the receiver sends an acknowledgment to the sender at Step 216. If no acknowledgment is required, the No path 218 is taken.

If the receiver runs out of space to store the incoming file as determined at Test Step 220, the Yes path 222 is taken to Step 224, where the receiver sends an out of space status message back to the sender. Processing then ends at End Step 226. This could occur when multiple file transfers are taking place simultaneously, or if the sender underestimates the size of the print file to be transferred. If there was enough space on the receiving system, the No path 228 is taken to continue processing of the file transfer.

If the file transfer is not complete (Test Step 230), the No path 232 is taken back to Step 210, where one or more additional data block messages will be sent by the sender. If the file is completely transferred to the receiver, Yes path 234 is taken and the sender sends a file complete message at Step 236. When transferring between mainframes, the file complete message contains a number of copies count and a banner name. The receiver queues the received file at Step 238, insuring that the file is correctly queued and complete before replying to the sender. If a Sym error occurs (Test Step 240), the Yes path 242 is taken to Step 244, where the receiver sends a sym error status message to the sender and processing ends at End Step 246. A Sym error might occur if the destination queue is not available, the copy count is illegal, or the banner name is illegal.

Figure 6A:
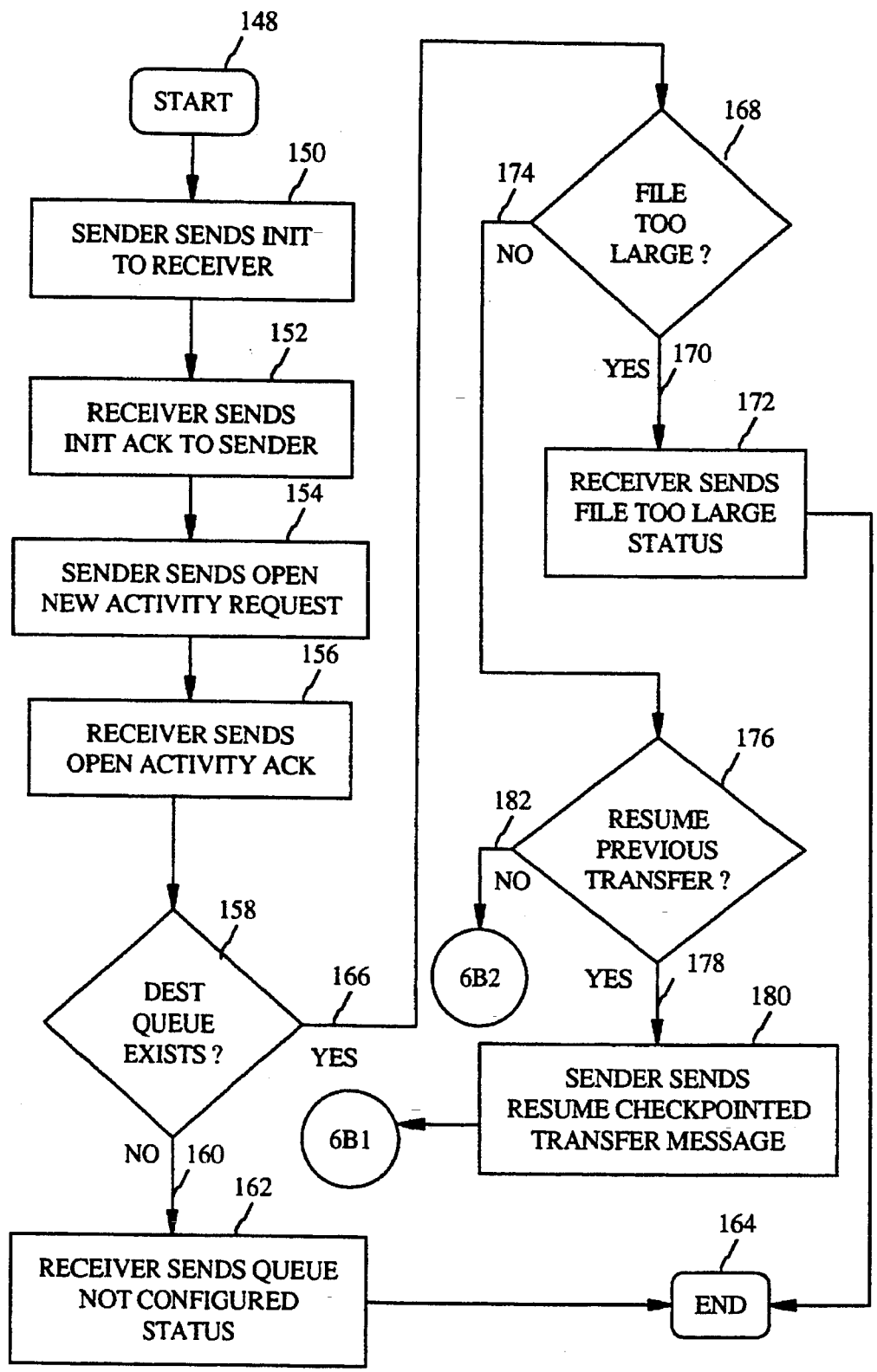
Figure 6C:
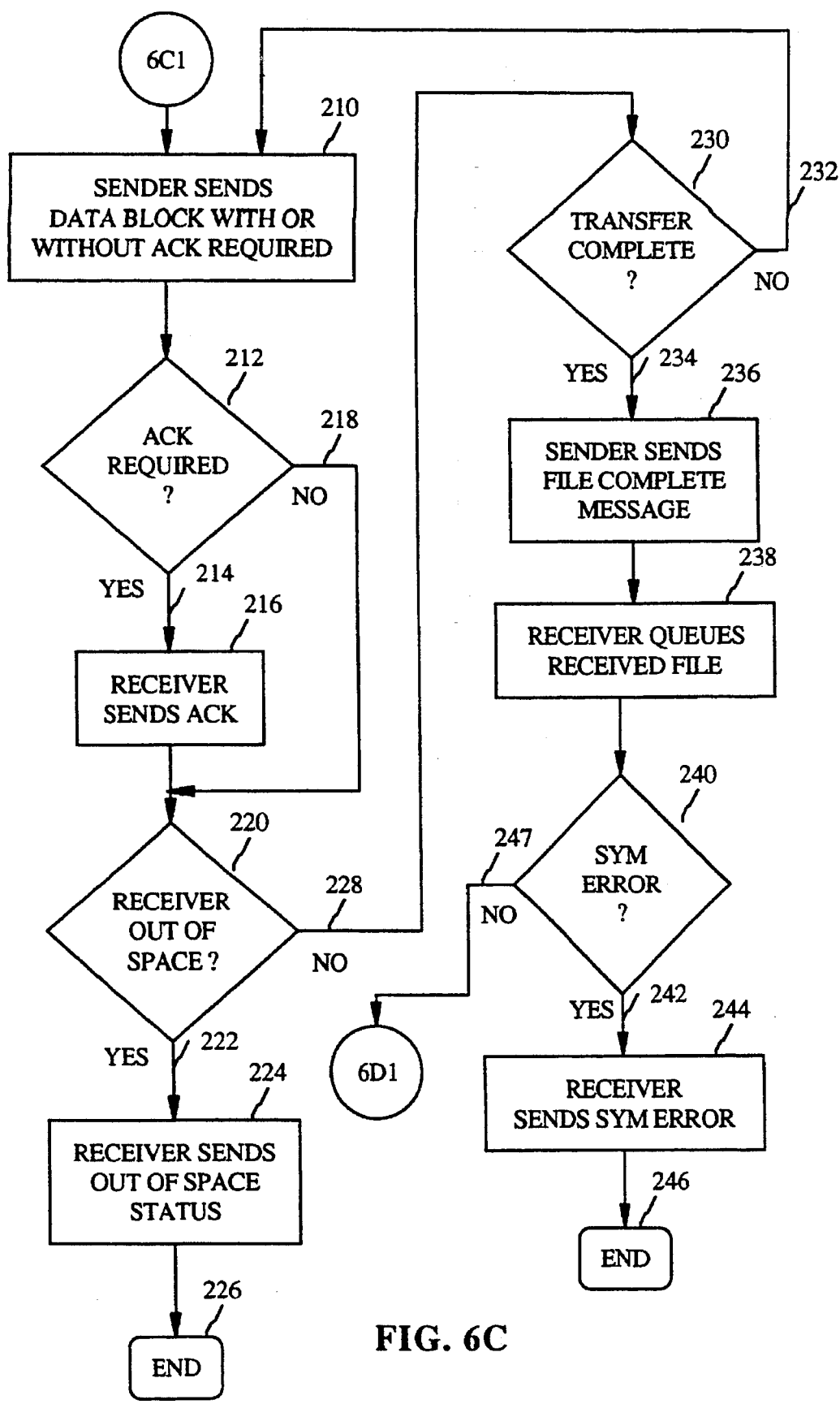
Figure 6D:
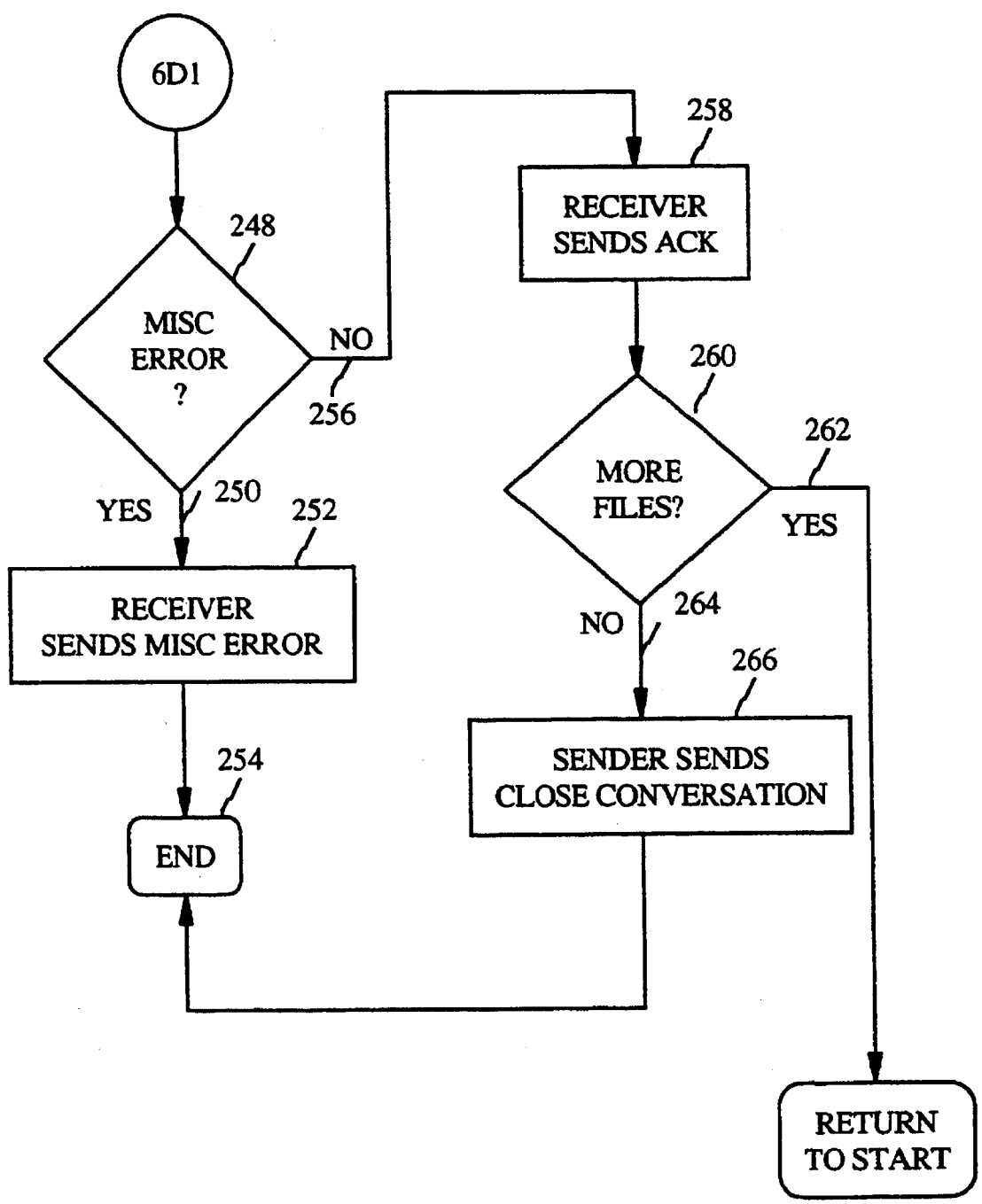

If there was no Sym error, processing continues via No path 247 on FIG. 6D via connector 6D1. If any other errors occur, these errors are considered to be miscellaneous errors. If there is a miscellaneous error (Test Step 248), the Yes path 250 is taken and the receiver sends a miscellaneous error message that includes the specific error code to the sender at Step 252. Processing then ends at End Step 254. If no errors occurred during the file transfer and the file is queued successfully, the No path 256 is taken and the receiver sends an acknowledgment to the sender at Step 258. Once the acknowledgment is received by the sender, it can dequeue the print request.

After successfully transferring and queuing the file, the sender will look for additional files to be sent. If there are more files (Test Step 260), the Yes path 262 is taken to return to the Start Step 148 on FIG. 6A. If there are no more files to be sent, the No path 264 is taken. The sender sends a close communications message to the receiver at Step 266 and file transfer processing is concluded. At any point in the protocol, either the sender or receiver may send an abort request. This message is sent if a fatal error (other than those discussed above) is encountered during file transfer processing.

IV. System Functional Overview

Figure 7:
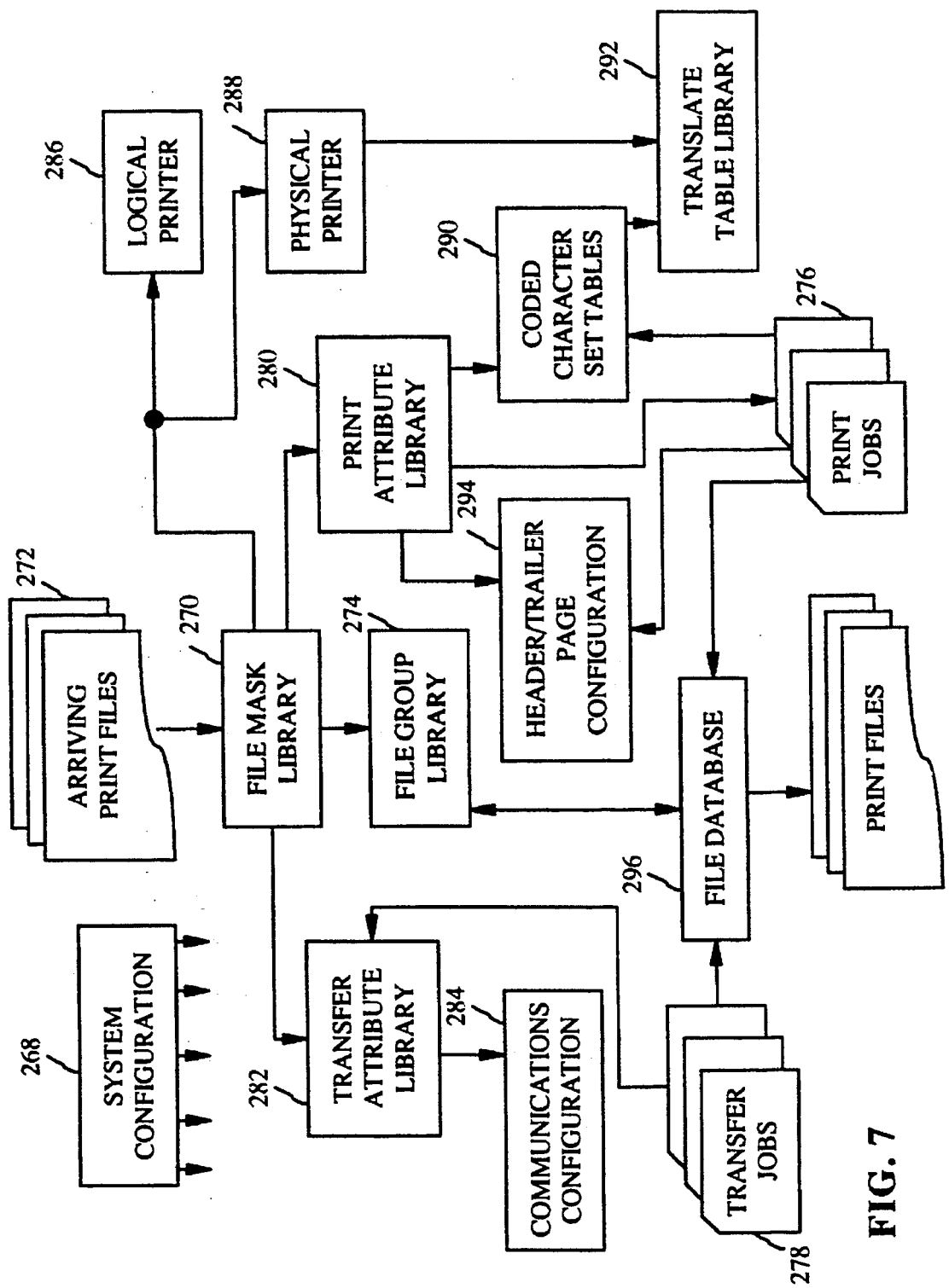
FIG. 7 is a block diagram of the main components of the present invention.

FIG. 7 is a block diagram of the main components of the present invention. The System Configuration 268 sets system variables that are used by the rest of the DEPCON system, including the local host name of the PC running the DEPCON PC component, the default directory used for storing print files on the PC, and various communication path limits. The File Mask Library 270 is a database of information determining how the system handles the Arriving Print Files 272. Each entry in the File Mask Library 270 is called a file mask. A file mask is a set of criteria used to route incoming Print Files into file groups. File groups are sets of Print Files managed by the system. File groups are stored in the File Group Library 274. The system uses file masks to route incoming Print Files into file groups automatically, but a user can also move Print Files between file groups via user input. Files remain in a file group until moved by user action, or until file disposition options indicate that they should be removed from the File Group Library 274. File disposition options are a set of options that determine how the system disposes of a Print File after all processing for that Print File is complete.

The user can specify print attributes or transfer attributes to be included in a file mask if Print Jobs 276 or Transfer Jobs 278 will be generated from the incoming Print Files.

Depending on the file mask information, the system can create a Print Job 276, a Transfer Job 278, both, or neither for an incoming Print File. A Print Job is a request to print a Print File on a printer connected to the system, along with all of the instructions necessary to carry out the request. Print Jobs 276 are created as a result of an Arriving Print File 272 being routed through the file mask, or at the specific request of a user. Print Job parameters include the name of the Print File, a physical or logical printer name, a job priority, and print attributes. The DEPCON system includes a spooler (not shown) that services idle physical or logical printers. If the system finds that there is a Print Job 276 to be serviced by an idle printer and the correct form overlay is loaded into the printer, then the system finds the highest priority Print Job and begins to service the Print Job. As the spooler composes print data contained in the Print File for the printer, it uses the print attribute information. This information is retrieved frown the Print Attribute Library 280 when the Print Job is created.

A Transfer Job 278 is a request to transfer a Print File to another computer connected to the system, along with all of the instructions necessary to carry out the request. Transfer Jobs 278 are created as a result of an Arriving Print File 272 being routed through a file mask, or at the specific request of a user. Transfer Job parameters include the name of the Print File, its priority, and the transfer attributes. When the DEPCON system finds that there is a Transfer Job to be serviced on an idle transfer path, it finds the highest priority Transfer Job and begins to transfer the Print File according to the transfer attributes. These transfer attributes are retrieved from the Transfer Attribute Library 282 when the Transfer Job is created.

Print attributes consist of instructions for printing a Print File. These attributes allow a user to control the printing of files and to take advantage of different printer's capabilities. Print attributes are specified in an entry in the Print Attribute Library 280. Each entry describes in detail how a Print Job should be composed and printed. Jobs which are to be printed in the same way can all reference a single entry. When a Print Job 276 is created, it includes a copy of the Print Attribute Library entry, not a reference to the entry in the Print Attribute Library. Print attributes include specifying the printer type, page size, page orientation, page margins, page heading margins, number of copies to be printed, duplex or simplex mode, command files to be used during printing, header/trailer page definitions, electronic forms overlays, input paper sources, output paper tray, print quality, page range to print, character size, lines per page, and character set definition.

Transfer attributes consist of a set of specifications for transferring a Print File within the system. They are templates that specify how, where, and when Print Files are transferred to another PC or mainframe. Each entry in the Transfer Attribute Library 282 describes in detail how a Transfer Job 278 should be serviced. Print Files which are to be transferred to the same destination can all reference a single Transfer Attribute Library 282 entry. When a Transfer Job is created, it includes a copy of the Transfer Attribute Library entry, not a reference to the entry in the Transfer Attribute Library. Transfer attributes include a primary communications path name, an alternate communications path name, the days of the week on which the transfer can take place, the time range on which the transfer can take place, and a transfer disable flag.

Each file mask contains masked fields that determine whether an Arriving Print File 272 matches the file mask. Each file mask in the File Mask Library 270 contains mask criteria, a file group name, and possibly contains a Print Attribute Library entry name, a physical or logical printer name, and/or a Transfer Attribute Library entry name. Matches might take place on run identifier, user identifier, file name, file qualifier, file cycle, account number, file type, project identifier, host system name, print queue name, or number of pages in the print file. Mask criteria can be defined to match an exact name or be used in the form of a mask, where a "*" character matches all subsequent characters and a "?" matches any single character. For example, one file mask might be used to handle accounting files. Accounting files might be defined in the mask criteria as having a print file name that starts with "ACCNTG*", under the user identifier ""ACC?00." If the matched file mask contains print attributes from a Print Attribute Library 280 entry, the system creates a Print Job 276 for the Print File.

If the matched file mask contains transfer attributes from a Transfer Attribute Library 282 entry, the system creates a Transfer Job 278 for the Print File 272. The Transfer Attribute Library 282 references communications paths set up in the Communications Configuration 284. The Communication Configuration 284 tells the system how to use INFOCONNECT 138 or other communications software paths. These communications paths are configured to send or receive Print Files to and from another PC or a mainframe running the DEPCON system. If the matched file mask contains print attributes from a Print Attribute Library 280 entry, the matched file mask must also contain the name of the Logical Printer 286 or Physical Printer 288 used to print the job.

The Physical Printer 288 configuration sets up the DEPCON system to work with individual printers attached to PCs with network print queues. Each entry in the Physical Printer 288 configuration describes a printer connection in the system. Physical printer attributes include the physical printer name, port name, file server name, server queue name, translate table name, banner options, and initialization options. If the printer is locally connected, a port name is specified. If the printer is connected to a network, a file server name, and server queue name are specified. If character translation is required for the printer, a translate table name is specified. Banner options specify the header and trailer page types. Finally, initialization options specify the initial state of the printer and what actions are to be taken if a network printer is unavailable. A Logical Printer 286 is a group of Physical Printers that have similar printing capabilities. A Logical Printer 286 is used when the user wants to share printing among several print devices with similar characteristics. The Logical Printer 286 references the Physical Printer 288 information. A Logical Printer 286 may represent up to 32 Physical Printers.

Print files received by the DEPCON system do not need to be printed or transferred. The present invention can also be used as a distribution tool, where files are simply put into the correct "drive:directory" location and thus distributed to users who may use the files with other computer programs. The named directory may exist on a PC's magnetic disk, a network file server, host-based disk, or other accessible storage devices. The DEPCON system also provides a print preview mode of operation where any print file may also be viewed in text mode without printing the file.

The system provides a default file mask if no matching file mask is found. The default file mask places the incoming Print File 272 in a default File Group Library 274 entry, creates a Print Job 276 using a default Print Attribute Library 280 entry, and places the Print Job on the print queue for the default Logical Printer 286. The system initially searches through the File Mask Library 270 entries in the order they are listed to find a match with the Arriving Print File's masked fields. Once a matching file mask is found, the file group name is used to reference an entry in the File Group Library 274. If the system does not find a match with the Arriving Print File 272, the default file mask will be used. If file mask processing creates a Transfer Job 278 to send the Arriving Print File 272 to a mainframe computer system for printing on a printer directly connected to the mainframe, the Arriving Print File 272 must be in Standard Data Format (SDF) or ASCII form. Pass-through Print Files can be sent to a mainframe for storage or subsequent transfer to another PC. Pass-through print files are those print files that are already formatted for a particular printer.

The system administrator continually updates the File Group Library 274. The File Group Library 274 is a database containing information on when the system should remove its record of a Print File 272, whether or not to delete the Print File from storage when the system removes its record of the Print File, where to store the Print File on the PC or in the network, and a file group priority to use in creating Print Jobs 276 or Transfer Jobs 278 for the Print File. This information applies to all Print Files allocated to a particular file group. Each file group entry in the File Group Library 274 contains a default file destination in "drive:directory" format. If the print file already exists in a location accessible by the DEPCON PC component, the print file will not be moved to the default file destination.

The file group entry also includes file disposition options to remove the print file when all outstanding print jobs for it are completed, to remove the print file from the DEPCON system after a user-specified number of days, and to delete the print file from its current "drive:directory" location when the print file is removed from the DEPCON system. The file group priority becomes the first character of a two-character job priority. The sending system where the file originated provides the other character for the job priority. The job priority specifies the priority of Print Jobs 276 or Transfer Jobs 278 created for Print Files in a file group. The system provides a default file group that removes the record of the Print File from the File Database and deletes the Print File from storage as soon as all Print Jobs or Transfer Jobs for that Print File are complete. File disposition options may be overridden by user inputs. Thus, a Print File can have different disposition options than other Print Files in the same file group.

A file group's values may be changed after Print Files have been placed into that file group. If a file group's settings are changed by the system administrator or PC operator, the new values are applied to all Print Files in the file group. However, if the file group's settings have been overridden by user input, the Print File will retain the values specified by the user input.

Coded Character Set Tables 290 are tables that specify a set of actions to be performed when code type changes are encountered in a Print File. Examples of coded characters sets are ASCII, Fieldata, and katakana. Allowable actions include sending a message to the user, loading a translate table from the Translate Table Library 292, or loading print commands from a user-supplied command file. Coded character sets may be used to access different international character sets or to add special effects such as italic or bold characters. A Coded Character Set (CCS) Table contains CCS identifier (ID) numbers from 0 to 63 and corresponding actions that are performed when the code type changes. The system provides a default CCS table. When the system prints a job using a CCS table, two steps are performed. First, before printing, the system finds the default CCS ID for the CCS table and performs the action specified by the default ID. Second, during printing, the system performs the corresponding actions when it encounters a change in the CCS ID. At the end of printing, if a trailer page is specified by the Header/Trailer Page Definition 294, the system checks the current CCS ID and reloads the default CCS ID, if necessary.

The Translate Table Library 292 contains tables used to translate character codes sent to a printer. Each entry in the Translate Table Library provides a character code to substitute for a character code in the Print File 272. Translate tables provide for user control over substitution of one character for another. For example, escape characters can be translated into spaces to prevent escape characters from reaching printers that cannot handle escape characters. The system provides a default translate table that does not change any character code.

Header/Trailer Page Configuration 294 specifies whether header or trailer pages are to be printed. Header pages are optional pages printed before a Print File, and trailer pages are optional pages printed after a Print File. Header and trailer pages are defined in the Header/Trailer Page Configuration 294 but selected by the user through print attributes. Header and trailer pages may be disabled for Print Jobs 276 with a specified print attribute or for a designated printer in the Physical Printer configuration. Different header and trailer pages may be used with different printers and Print Files. Users can define custom header and trailer pages or use default pages.

V. The File Database

The system manages a record in the File Database 296 for every Print File being controlled. The File Database entry contains information on where the Print File came from, what kind of file it is, and other related information. The File Database entry also references the file group information stored in the File Group Library 274. This information is used for recovery purposes in case of a system error. FIG. 8 is a table showing the data elements stored in an entry of the File Database 296. The Acquire Date 298 and Acquire Time 300 are the date and time that the Print File was received by the DEPCON system. The PC Group 302 is the file group name that this Print File has been allocated to. The PC Priority 304 is the priority of the Print File as assigned by the file group on the PC. The Host Queue 306 is the name of the print queue on the mainframe computer system where the Print File came from. The Host Priority 308 is the priority of the Print File as assigned by the mainframe involved in the transfer or print request. The Host System Name 310 is the name of the mainframe computer system involved in the print or transfer request. The combination of the Host Qualifier 312, Host File Name 314, and Host F Cycle 316 is a unique identifier for the Print File on the mainframe. The Host Run ID 318 is the identifier of the run (i.e., identifying an instance of execution of the application program which generated the Print File). The Host Account Number 320 is the name of the account on the mainframe for the application program which generated the Print File was executing.

The Host Project ID 322 is the identifier of the user project under which the generating application program executed. The Host User ID 324 is the identifier of the user who requested execution of the generating application program. The Host Banner ID 326 is a message to be displayed on the header or trailer attached to the Print File. The Estimated Pages 328 is the probable number of pages to be printed from the Print File. The Transport Type 330 indicates how the system received the Print File. This value could indicate a local request, reception via INFOCONNECT 138, or through Dynamic Data Exchange (DDE), a WINDOWS interface. The Transfer Date 332 and Transfer Time 334 are the date and time of transferring the Print File to another destination in the network. The File Type 336 specifies SDF, ASCII, or pass-through. The Host ASG Time 338 and Host ASG Date 340 are the time and date of creation of the Print File on the mainframe. The Print File Name 342 is the full name of the actual Print File. The Remove Days 344 field specifies the number of days to keep the Print File record in the File Database 296 before removing it. The Remove On Comp 346 field is a flag signifying whether to remove the Print File from the File Database upon completion of all jobs based on this Print File. The Delete On Removal 348 field is a flag signifying whether to delete the Print File from a PC's storage after completion of all jobs based on the Print File. The Printer Type 350 is the name of the kind of printer selected to print this Print File. The Backup Type 352 indicates either "Save" or "Archive". If it is "Save", the Print File has been copied to storage on the PC. If it is "Archive", the Print File has been copied to storage on the PC and also records of the file were removed from the DEPCON system. The Backup Date 354 and Backup Time 356 are the date and time of a storage backup of this Print File. The Record Size 358 is the size in bytes of the File Database record. The Most Recent PA field 360 saves the latest print attribute information used for this Print File. The Most Recent PR field 362 is the identifier of the last printer used to print this Print File. Finally, the Checked By field 364 is used to save the identifier of the computer operator or user who is responsible for this Print File.

The File Database 296 contains each Print File's priority from the sending system. For files arriving from a mainframe, this is the priority the Print File had on the 1100 or 2200 Series mainframe, or other computer system print queue. For files arriving from another PC, this is the priority the other PC assigned to the file. A composite job priority is created for every Print Job 276 and Transfer Job 278 processed by the system. The job priority is composed of the priority assigned by the file group for a Print File (PC Priority 304) and the priority from the sending computer system (Host Priority 308).

VI. Print And Transfer Job Creation

Referring back to FIG. 7, the creation of a Print Job 276 from an Arriving Print File 272 is performed in the following manner. A Print Job 276 is created from an Arriving Print File 272 when a file mask from the File Mask Library 270 that corresponds to the Print File references a Print Attribute Library 280 entry. If the file mask contains a print reference, the file mask must also reference a Logical Printer 286 or Physical Printer 288 for printing the Print Job. The Print Job list 276 keeps information about all outstanding Print Jobs. The system references this list when an attached printer is ready for another file to print. Each entry in the list contains all details necessary for printing the Print File, including a reference to the Print File's entry in the File Database 296, the Print Job's priority, a copy of the Print Attribute Library 280 entry for the Print File, and the name of the Physical Printer 288. When the system creates the Print Job 276, the Print Attribute Library 280 entry named in the file mask is copied into the Print Job. Since the Print Attribute Library entry referenced Header/Trailer Page Configuration 294 information, and may have referenced Coded Characters Set Tables 290, the Print Job also references this information.

Print Jobs 276 may be modified after their creation. The user can modify the Print Job's priority, how the Print File is to be printed, and the name of the printer. Modification of the Print Attribute Library 280 entry that was used to create the Print Job has no effect on the existing Print Job.

Creation of a Transfer Job 278 from an Arriving Print File 272 is performed in the following manner. After an entry is made in the File Database 296 for the Arriving Print File 272, and it is determined that the file mask specifies a Transfer Attribute Library 282 entry, the system creates a Transfer Job 278 for the Arriving Print File. The system copies the template values into the Transfer Job instructions. Transfer Jobs are kept in a Transfer Job list 278. Each Transfer Job references the Print File's entry in the File Database 296 and contains a copy of the transfer attribute that was named in the file mask.

Print Jobs and Transfer Jobs can also be created from files that are local to a PC, rather than from files received from a mainframe over a network. Local files are files that can be accessed on any drive that the Disk Operating System (DOS) can access through the standard "drive:directory" format. Processing of a local Print Job or Transfer Job is very similar to processing of a Print Job or Transfer Job for an Arriving Print File.

VII. DEPCON System Components

A. System Configuration

Figure 9:
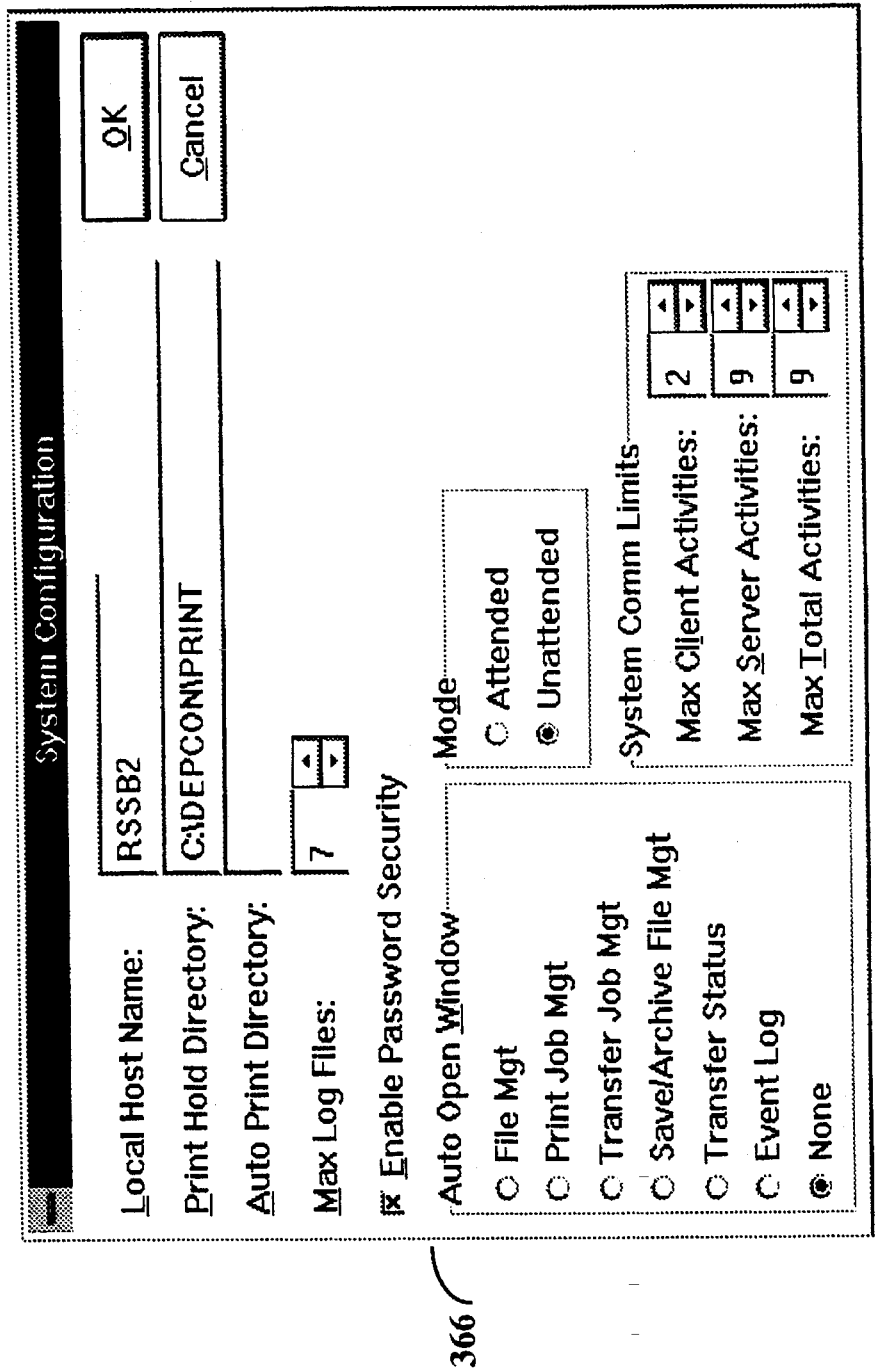
FIG. 9 is a diagram of the System Configuration attributes.

The System Configuration 268 sets variables that control the DEPCON system. FIG. 9 is a diagram of the System Configuration attributes 366. The Local Host Name is the name of the PC that this copy of the DEPCON PC component is executing on. The Print Hold Directory is the default drive and directory on the PC where arriving Print Files are to be stored. This directory must exist at the time of execution of the PC component. This location may be overridden by the file group. The Max Log Files value is the maximum number of daily log files that the system maintains on this PC. This value may be between two and 366. Once the limit has been reached, the system deletes the oldest log file before creating a new log file. The Enable Password Security field holds a flag indicating whether a user must enter a password before making configuration changes to the system. The Auto Open Window attribute indicates which user interface window is to be opened upon initialization of the system. The Mode values specifies the mode of operation of the system. If the Mode is Attended, the system displays an error message on the PC's display every time an error occurs. If the mode is Unattended, the system displays an error message on the PC's display only when a system-critical or operator-induced error occurs. When other errors occur, the system only writes the error message to the log file. The System Comm Limits specify the maximum number of file transfers that a single PC component can send, receive, or send and receive simultaneously.

B. Communications Configuration

The Communications Configuration 284 controls which INFOCONNECT communications paths to use for the system. These paths may be configured to send or receive print files from another PC or a mainframe computer system. FIG. 10 is a diagram of the Communications Configuration attributes 368. The Available Paths are the communications paths configured by the INFOCONNECT communications software. The Server Limits consist of a maximum number of Activities and a Block Size. The Activities value is the maximum number of concurrent incoming (receiving) file transfers that a single PC can open on a selected communications path. The Block Size is the maximum message block size used by the PC on the selected communications path. In the preferred embodiment, the minimum block size is 512 bytes and the maximum block size is 64,000 bytes. However, most communications protocols use a maximum block size of 4,096 bytes. The Client Limits also consist of a maximum number of Activities and a Block Size, as well as a number of messages per acknowledgment value. The Activities value is the maximum number of concurrent outgoing (sending) file transfers that a single PC can open on the selected communications path. The Block Size is the maximum message block size used by the PC on the selected communications path. The Messages Per Acknowledgment (MSGS PER ACK) value is the number of messages the PC can send on the selected communications path before requiring an acknowledgment message from the receiver. The Peer Type is the type of computer at the other end of the communications path. In the preferred embodiment, possible node types are PC, UNIX, and 1100/2200 Series mainframe computer systems, although other systems could be added. The Maximum Total Activities value is the maximum number of concurrent file transfers that the PC can open on the selected communications path. The maximum can be less than the sum of the Server Activities and Client Activities.

C. File Mask Library

Figure 11:
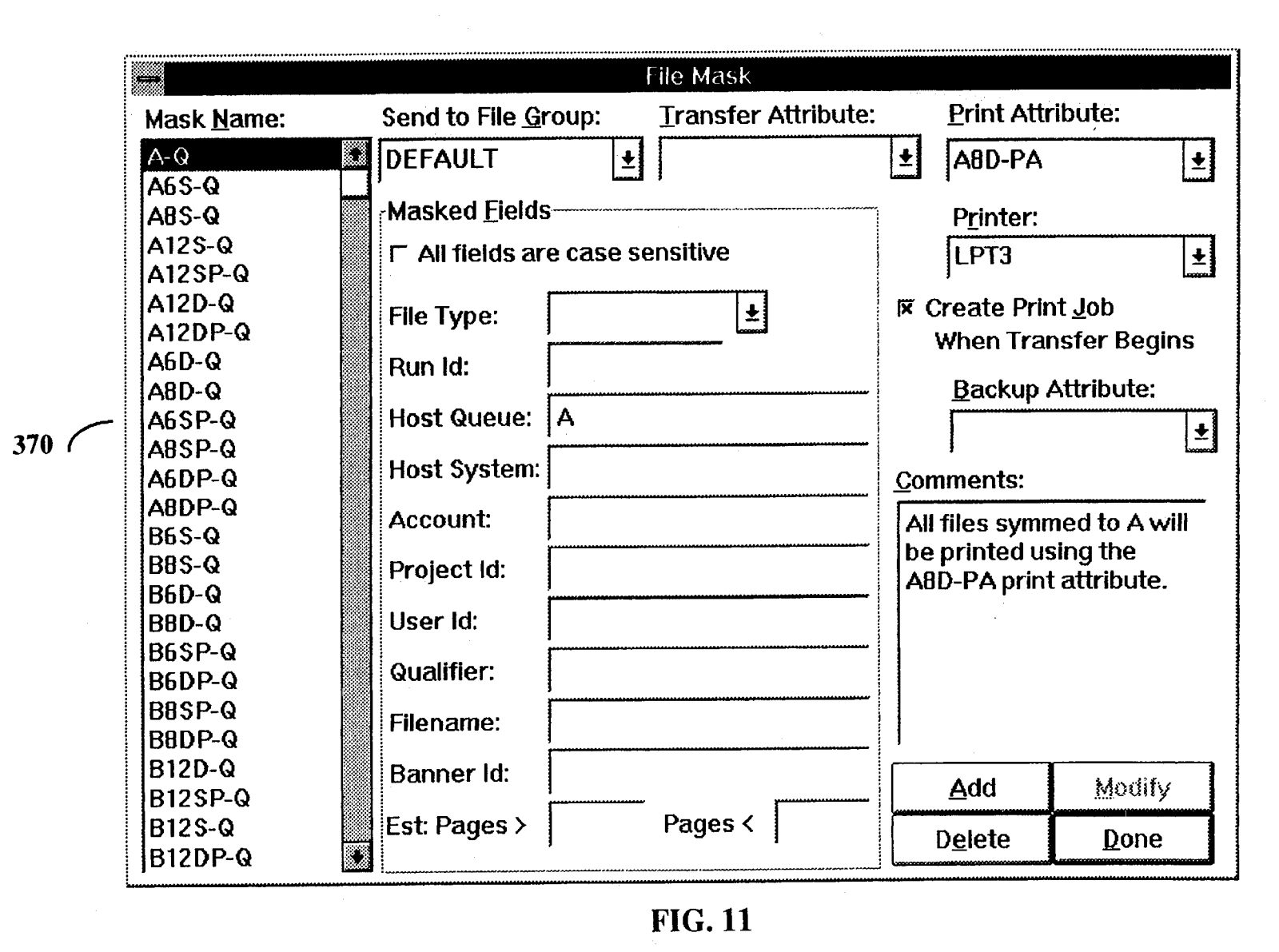

The File Mask Library 270 entries determine what the system does with an Arriving Print File 272. Incoming files are always routed to a file group. The file mask can cause the system to create a Print Job 276, a Transfer Job 278, both kinds of jobs, or no jobs for an incoming print file. If the file mask contains a print attribute, the system creates a Print Job for the file. If the file mask contains a transfer attribute, the system creates a Transfer Job for the file. The user specifies the actions performed on an incoming print file by setting up file mask criteria. FIG. 11 is a diagram illustrating File Mask Library entry attributes 370. The Mask Name is a list of all configured file masks in the order that they are searched by the system. The Send To File Group field specifies the file group that is associated with the selected file mask. If an incoming print file matches this file mask, the system routes the print file to the specified file group.

The Transfer Attribute specifies the Transfer Attribute Library 282 entry used to create a Transfer Job 278 for files that match the file mask. The Print Attribute specifies the Print Attribute Library 280 entry used to create a Print Job 276 for files that match the file mask. The Printer field specifies the Logical Printer 286 or Physical Printer 288 that the system uses when printing files that match the file mask. The Masked Fields specify the criteria that the system uses for masking Arriving Print Files 272. Each of the Masked Fields is a file attribute containing information about a print file. The File Type specifies the type of incoming print file. In the preferred embodiment, it can be ASCII, SDF, or pass-through, although other types of files could be processed similarly. The Run ID is the execution identifier of the application program that generated the print file. The Host Queue is the name of the print queue on a mainframe computer system where the print file originated. The Host System is the name of the mainframe or PC that sent the print file.

Further Masked Fields include the Account, which is the number of the account on a mainframe computer system used to execute the application program which generated the print file. The Project ID and User ID are the identifiers of the project and user which generated the print file. The Qualifier and Filename indicate the name of a print file on the mainframe. The Banner ID specifies a user-supplied name to be placed on a header or trailer page to be printed with the print file. Finally, the Estimated (EST) Pages values select the available range of pages of a print file that match this file mask. The smallest number of pages is 1 and the largest is 9,999,999. The Est. Pages>field is a page count lower bound. The Page<field is a page count upper bound.

D. File Group Library

File groups contain print files. For example, separate file groups could be defined for accounting, production, or manufacturing print files, or for print files with the same account number or project identifier. The system uses file masks to route print files into file groups. Print files remain in a file group until moved under user control or until the file group's disposition options indicate that the print files should be removed from the File Database 296. FIG. 12 is a diagram of a File Group Library entry definition 372. The File Group field is a list of all file groups in the File Group Library 274. The File Disposition Options determine when a file is removed from the File Database 296 and what happens to the print file at that time. The file may be removed on completion of all jobs for the print file or after a specified number of days. The print file may also be deleted from the PC's magnetic disk storage after it is removed from the File Database. The Group Priority is the priority level of the selected file group. In the preferred embodiment, the Group Priority consists of a number or a letter, with "0" being the highest priority and "Z" being the lowest priority. The Group Priority becomes the first character of the two-character job priority. The Group Print Hold Directory is the drive and directory where print files are to be stored for this file group. This value will override the directory specified by the System Configuration 268.

E. Print Attribute Library

Figure 13:
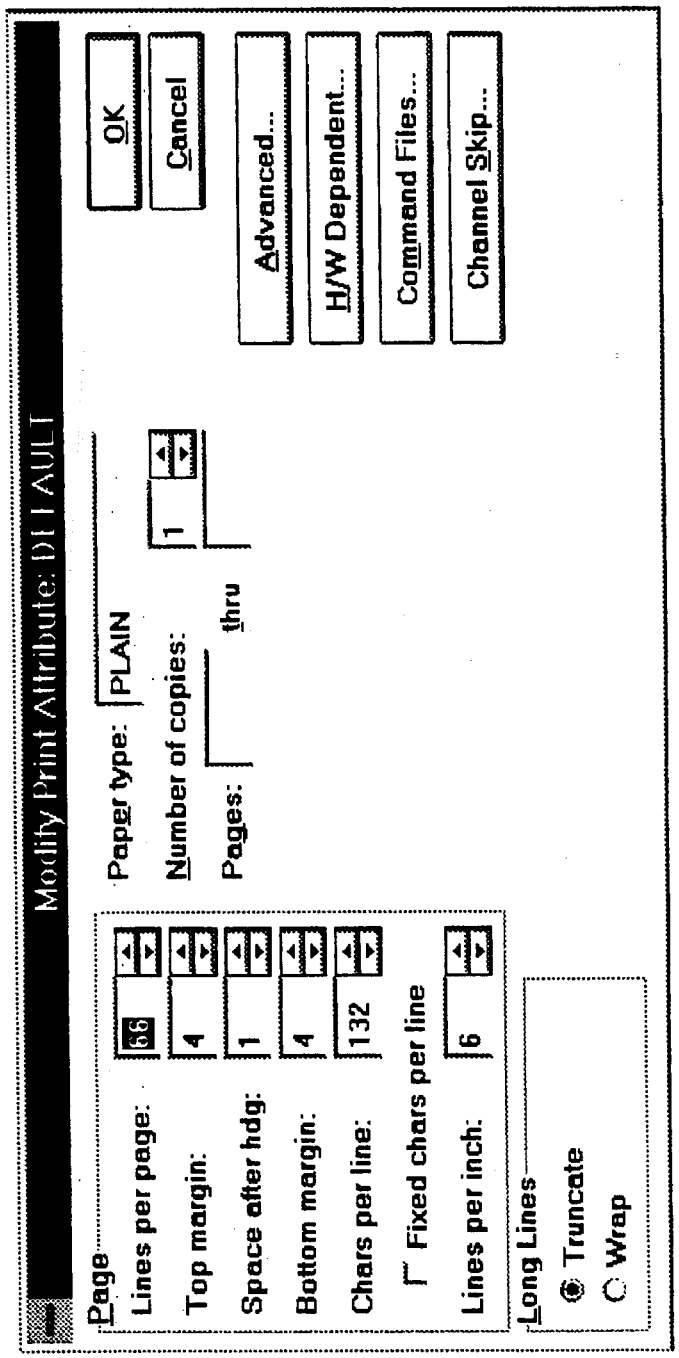
FIG. 13 is a diagram showing the basic Print Attribute Library values that may be modified by the user.

A print attribute is a set of specifications that the system uses to print a file. It includes a set of basic print specifications and optional advanced, hardware-dependent, and command file specifications. Each print attribute is contained in an entry in the Print Attribute Library 280. FIG. 13 is a diagram showing the basic Print Attribute Library values 374 that may be modified by the user. The Page Characteristics include lines per page, top and bottom margins, characters per line, and lines per inch. The Long Lines field determines how the system handles long lines that exceed the characters per line limit. If the Long Lines field is Truncate, excess characters are cut off. If the Long Lines field is Wrap, excess characters are printed on the next line. The Paper Type is the type of paper or form. The printer only chooses a Print Job for processing that has a paper type matching the paper currently loaded in the printer. The Number Of Copies values specifies the number of times the print file is printed. Finally, the Pages field specifies the starting and ending pages to be printed when printing a range of pages.

Figure 14:
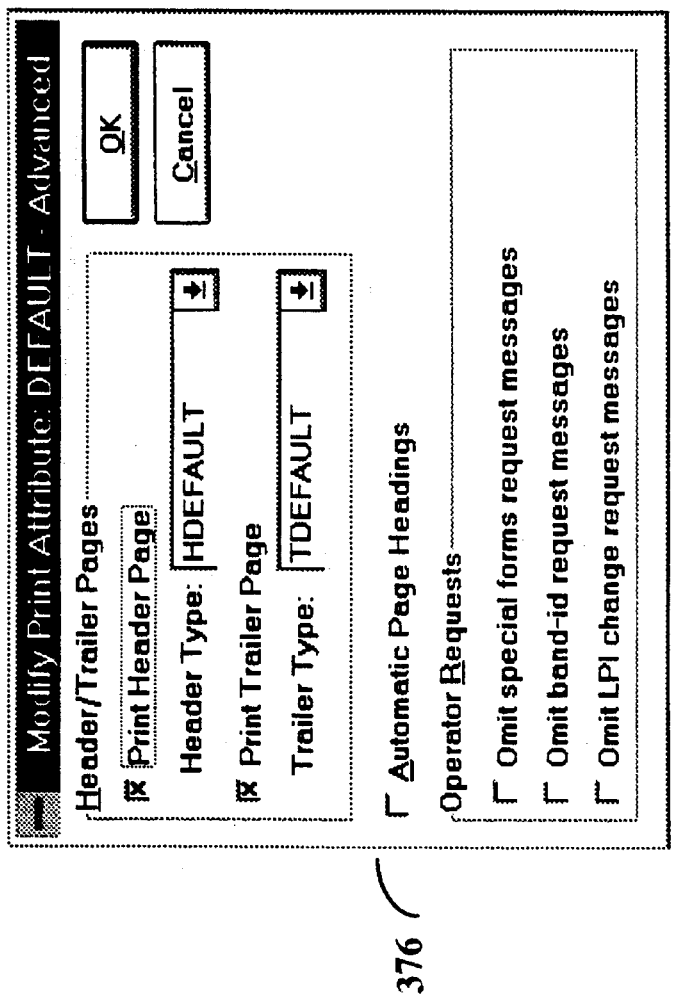
FIG. 14 is a diagram showing the advanced Print Attribute Library values that may be modified by the user.

FIG. 14 is a diagram showing the advanced Print Attribute Library values 376 that may be modified by the user. The Header/Trailer Pages values allow a user to print or suppress the printing of header and trailer pages. Additionally, header and trailer page definitions may be specified by the Header Type and Trailer Type fields. Operator Requests allow a user to suppress messages caused by print control records in SDF print files. Requests include omitting special forms request messages, band-identifier request messages, and lines per inch change request messages found in print files.

FIG. 15 is a diagram showing the hardware-dependent Print Attribute Library values 378 that may be modified by a user. The Printer Type specifies the model number of a selected printer. The Coded Character (CHAR) Set is a list of available Coded Character Set Tables 290. The Page Size specifies the size and type of the page, such as 8½×11 Letter, A4, etc. The Character Size Adjust specifies an adjustment to the selected font size in points or characters per inch. Page Margins also may be modified, as well as a selection of which input paper bin on the printer is to be used. Print Quality specifies either draft, data processing, or letter quality printing. Orientation selects either portrait or landscape mode of printing a file. Simplex/Duplex provides the option of printing on only one side of a sheet of paper (simplex) or printing on both sides of a sheet of paper (duplex). In addition, when printing in duplex mode, the margins may be manipulated to provide for Long Edge Binding or Short Edge Binding. The 2-UP field specifies that two pages of a print file are to be printed on a single side of a page. If a portrait Orientation is selected, 2-UP pages are printed one on top of the other. If a landscape Orientation is selected, 2-UP pages are printed side by side.

Figure 16:
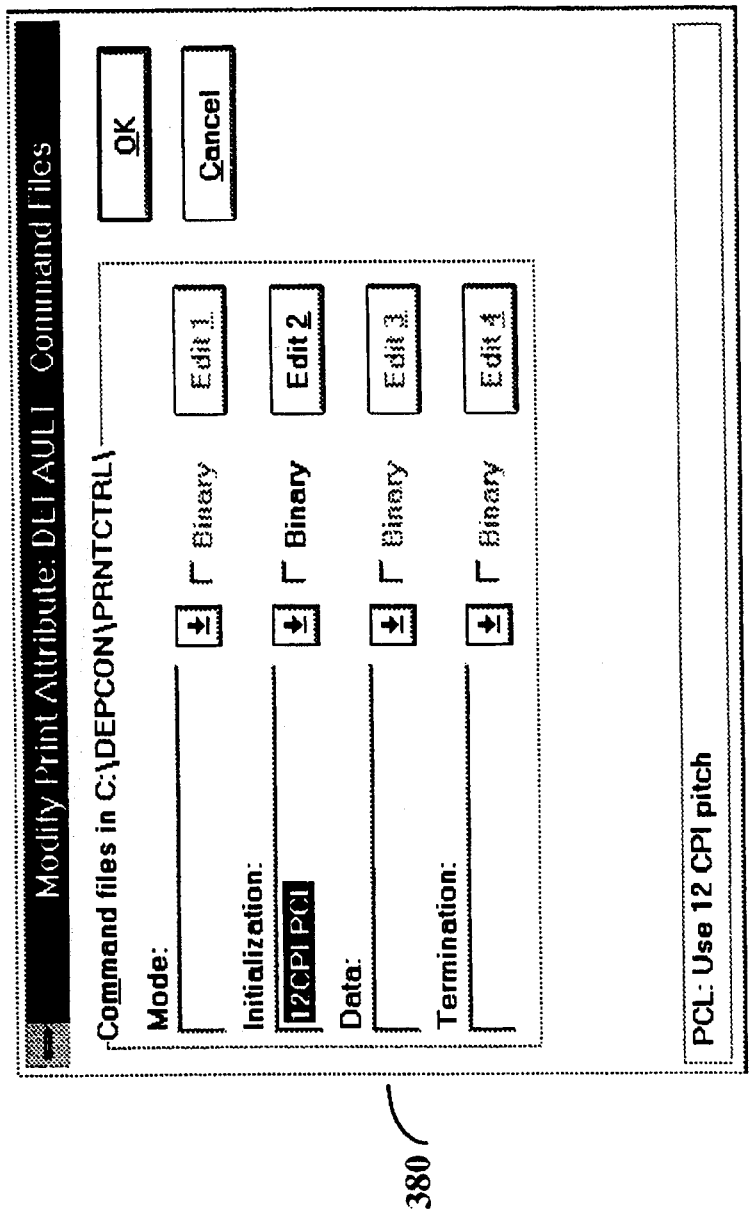
FIG. 16 is a diagram showing how a command file may be selected for use with a print attribute.

A command file contains a string of printer commands that allow a user to direct printer control functions such as switching fonts, changing printer emulation modes, and selecting bold fonts. FIG. 16 is a diagram showing how a command file 380 may be selected for use with a print attribute. The Mode selects an emulation mode. For printers that support emulation modes such as POSTSCRIPT and PCL, mode command files allow a user to switch between modes and access different printer command sets. The Initialization field indicates a file containing device-specific commands to be sent to a printer before the print file or the header page begins printing. The Data field selects a file containing device-specific commands to be sent to a printer after the header page is printed but before the print file begins printing. The Termination field selects a file containing device-specific commands to be sent to a printer after the print file and the trailer page are printed.

F. Transfer Attribute Library

Figure 17:
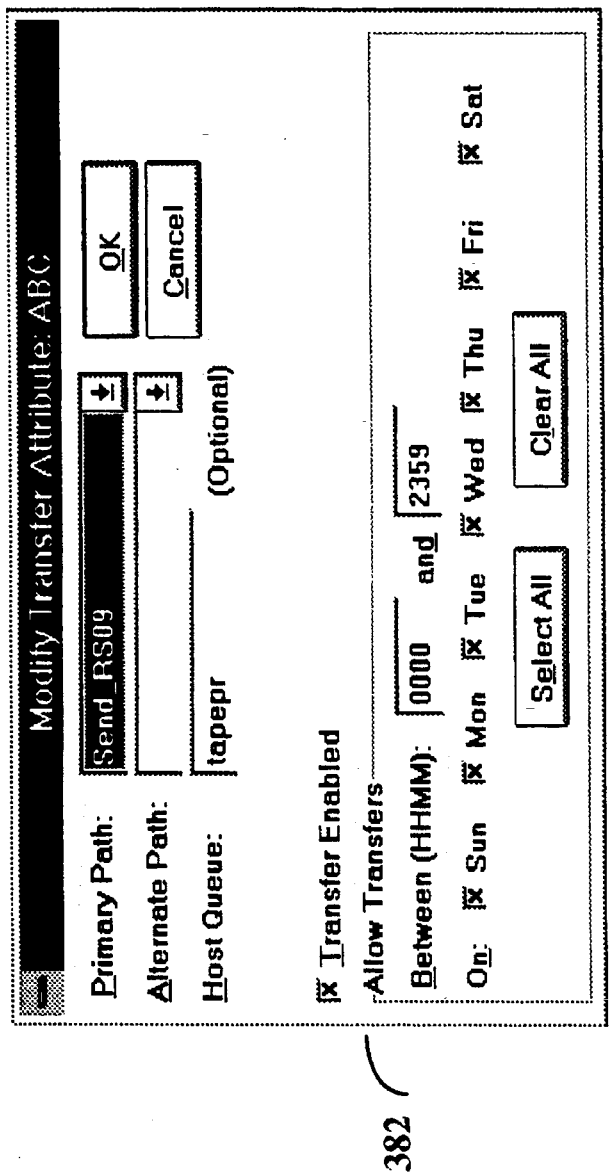
FIG. 17 is a diagram showing the Transfer Attribute Library values that may be modified by the user.

A transfer attribute is a set of specifications that the system uses to control the transfer of a print file. Transfer attributes include primary and alternate communications paths, a host queue name, and a time range when transfers are allowed. Each transfer attribute is contained in an entry in the Transfer Attribute Library 282. FIG. 17 is a diagram showing the Transfer Attribute Library values 382 that may be modified by the user. The Primary Path is the communications path that the system uses initially to transfer a file. The Alternate Path is the communications path that the system uses to transfer a file if the Primary Path fails. The Host Queue specifies the destination print queue for transfers to an 1100/2200 Series mainframe computer system. The Transfer Enabled flag provides a way to inhibit a file transfer. The Allow Transfers field sets the times and days of the week when transfers can take place.

G. Physical Printer

Figure 18:
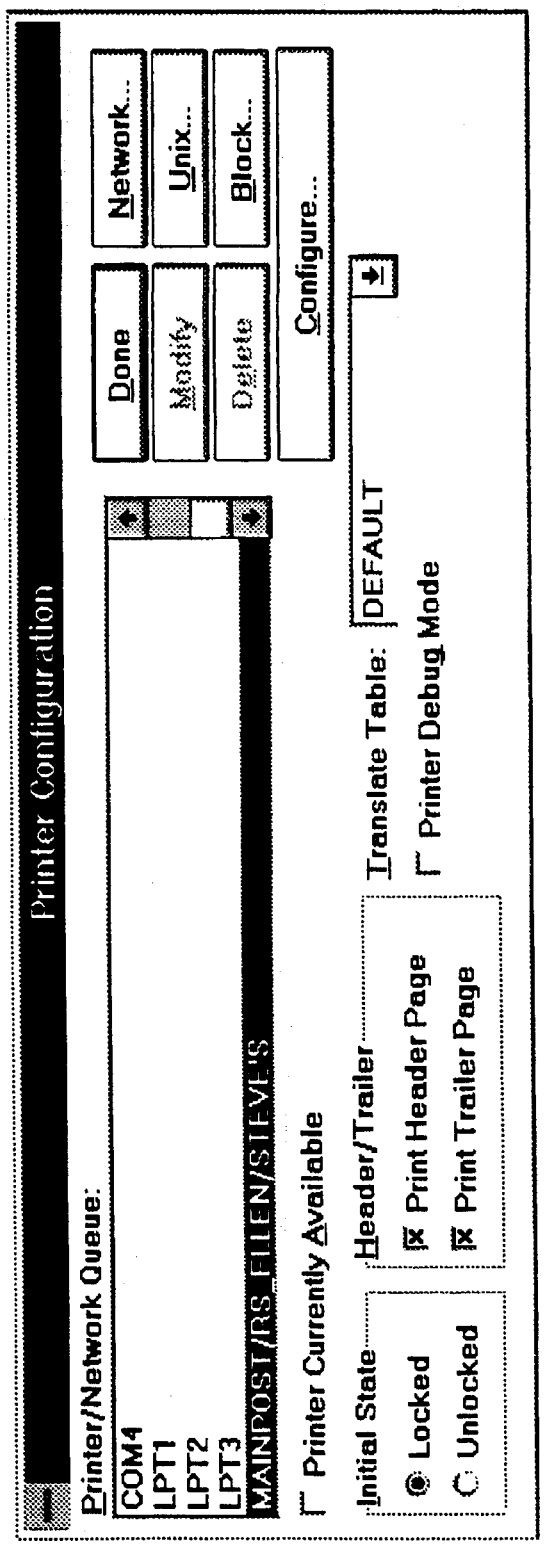
FIG. 18 is a diagram illustrating Physical Printer characteristics.

The Physical Printer 288 configuration sets up the system to work with individual printers attached to a PC and with Novell, Inc. network print queues. FIG. 18 is a diagram illustrating Physical Printer characteristics 384. The Print/Network Queue contains a list of all configured printers and network queues. If the Printer Currently Available field is selected, the printer is enabled and added to the list of available printers. If it is not selected, the printer is disabled and removed from the list of available printers. The Make Printer Available When PC Is Attached To File Server field automatically enables the selected printer whenever the PC is logged onto a file server. The initial State determines the printer's initial logical state. If it is locked, then a user can print a test job or change paper before printing. If it is unlocked, it begins printing as soon as a Print Job is available. The Print Header Page and Print Trailer Page enable or disable the printing of header and trailer pages. The Translate Table field selects a Translate Table for use during printing of a file. The Printer Debug Mode allows a user to obtain a debug file of all data sent to the printer. When in this mode, all characters sent to the selected printer are also written to a disk file on the PC. The Print Network banner Page field enables or disables printing of a banner page. The UNIX Printer, Accessed Via Transfer Attributes field specifies a transfer path used to send a print file to a UNIX workstation after the DEPCON system has composed the print file.

H. Logical Printer

Figure 19:
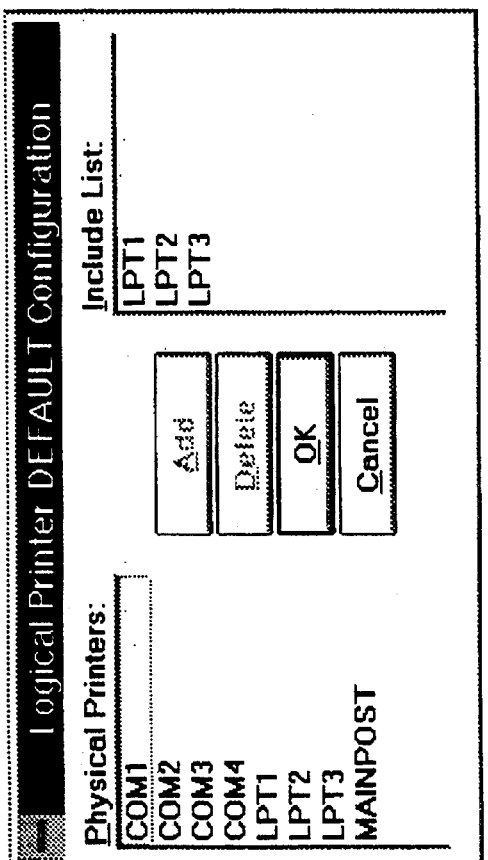
FIG. 19 is a diagram illustrating a Logical Printer to Physical Printer mapping.

The Logical Printer 286 configuration specifies a logical-to-physical mapping of printers. A Logical Printer may represent up to 32 Physical Printers 288. The first available Physical Printer in a selected Logical Printer's configuration prints a file sent to that Logical Printer. FIG. 19 is a diagram illustrating a Logical Printer to Physical Printer mapping 386. The Physical Printers list contains all available Physical Printers that are configured in the system. The Include List contains all Physical Printers currently assigned to the selected Logical Printer. Physical Printers may be added or deleted from a Logical Printer mapping.

I. Translate Table Library

Translate Tables stored in the Translate Table Library 292 are used to translate character codes sent to a printer. A default Translate Table is provided that does not change any character code. FIG. 20 is a diagram showing the default Translate Table 388. As each character code is being sent to a printer, it is compared to a predetermined Translate Table for possible modification. The Translate Table entry selected by the character code is exchanged for the character code. The new value is then sent to the printer. Users may construct and modify Translate Tables to change how a print file is to be printed on a particular printer. For example, a Translate Table may be used to remove control codes from a print file during the printing process.

J. Coded Character Set Tables

Figure 21:
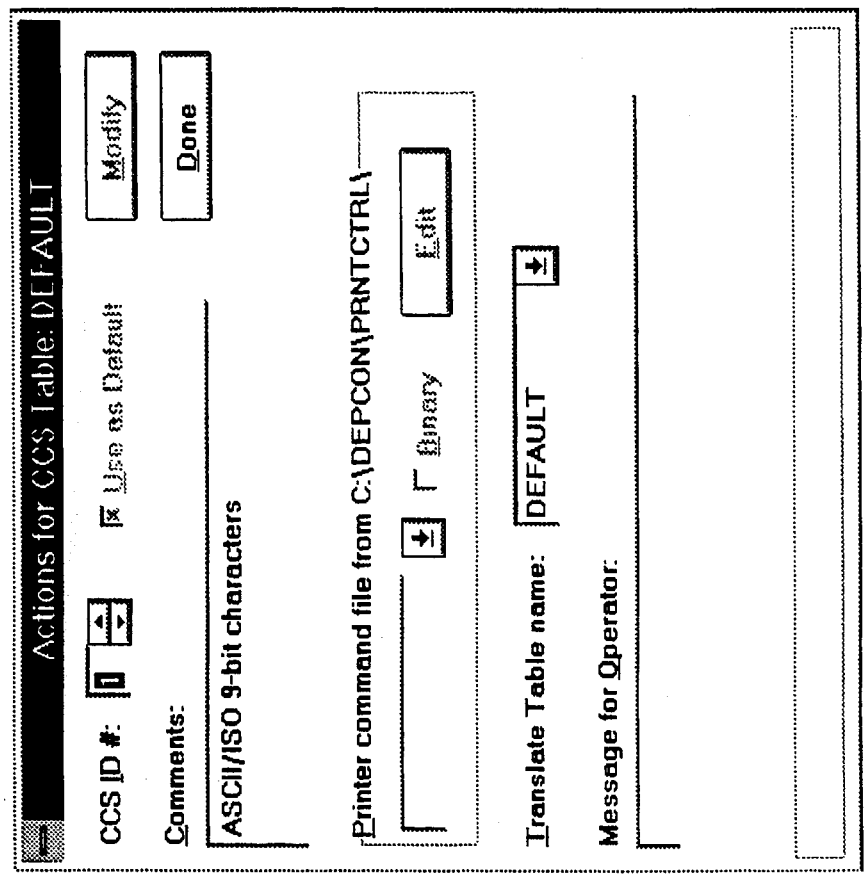
FIG. 21 is a diagram showing Coded Character Set Table actions.

A Coded Character Set (CCS) Table defines a set of actions that are performed when code type changes occur in an SDF print file. The actions performed by the system using Coded Character Sets include sending a computer operator message, loading a Translate Table, or loading a command file. These actions may be used to access different international character sets or to add special effects such as italic or bold characters. In the preferred embodiment, Coded Character Sets are used only with SDF files. FIG. 21 is a diagram showing Coded Character Set Table actions 390. The CCS ID identifies a particular coded character set. Examples of Coded Character Sets supported in the preferred embodiment include Fieldata, ASCII, EBCDIC, JIS (kanji), ISO 646, katakana, and others. The Printer Command File specifies a file containing a string of printer control characters that are specific to an individual printer. The system sends the string of characters to the printer when it encounters the corresponding CCS ID number in the print file. Printer command files can be used to perform printer control functions. For example, they could be used to load a new font. The Translate Table Name lists all available character Translate Tables that could be selected for use in conjunction with this Coded Character Set. The Message For Operator is a text string that is sent to the computer operator of the mainframe computer system when the DEPCON system encounters the corresponding CCS ID number in the print file. For example, the message could ask the operator to mount a different printer cartridge or print band. The operator is required to respond to the message for processing to continue.

K. Header and Trailer Page Configuration

Header and Trailer pages are optional pages printed before Print Job data pages and after Print Job data pages, respectively. The Header/Trailer Page Configuration 294 holds all header and trailer page definitions. Header/Trailer page definitions may be created and modified by the user. FIG. 22 is a diagram showing an example of the Header/Trailer Page Configuration 392. The Definition Name contains a list of the existing header and trailer page definitions. Items list parameters that can be included in a header or trailer page. The Characters (CHARS) Per Line is the maximum number of characters in any line on the page. The system uses this number to calculate the character position of an item when configuring the page. When the page is printed, the actual number of characters per line is determined by the print attribute used to create the Print Job. The Line Items List shows the items selected for a given header or trailer page, together with the information on how to print each item. The entries appear on the Line Items List in the order that they will be printed. The information for every item includes a Line Number, an Item Name, a Data flag, a Prefix flag, an Overflow flag, a Position, and a Size. The Line Number is the number of lines from the top (T) or the bottom (B) of the page. The Item Name is the name of the item to be printed on the page. The Data flag is "Yes" if the actual value of the item is to be printed. The Prefix flag is "Yes" if a short description of the item is to be printed. If the Overflow flag is "Yes", the item's data is allowed to exceed its character limits. For example, if an item is to be held in the center third of the page, it is normally truncated to fit that boundary. The Position is the character position number of the item. The Size defines the size of the characters used to print the item.

VIII. File Mask Processing

Figure 23:
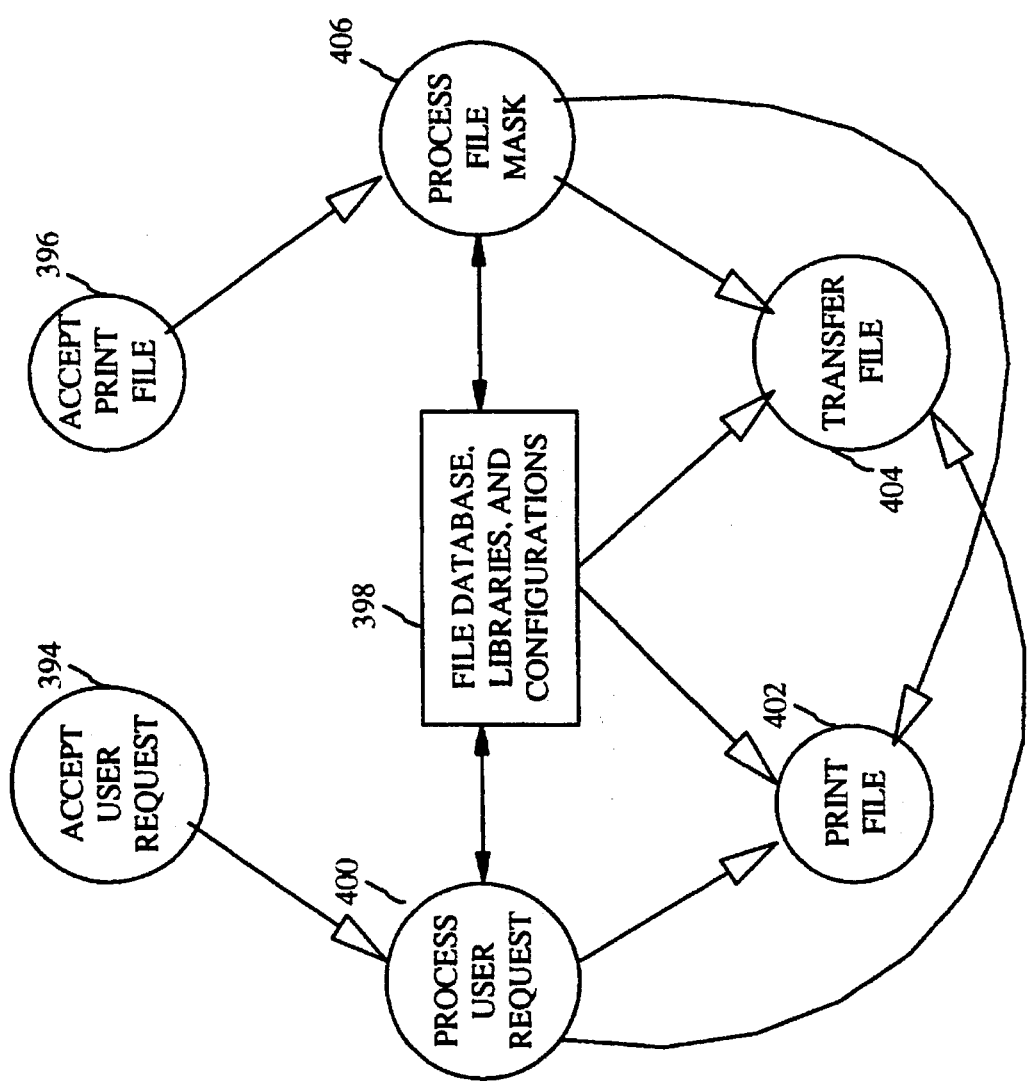
FIG. 23 is a high-level flow diagram of the Distributed Enterprise Print Controller system processing.

FIG. 23 is a high-level flow diagram of the Distributed Enterprise Print Controller system processing. There are two types of inputs to the system. In the Accept User Request function 394, the system receives user requests to control the transferring and printing of files by way of a keyboard, mouse, or other user input device. In the Accept Print File function 396, the system receives a print file from another computer system connected to the computer network. User requests consist of three basic types: to update or modify the existing values stored in the various databases and libraries discussed above, to print a file, or to transfer a file. If the user request is to update an attribute of the system, one of the libraries in the File Database, Libraries, and Configurations 398 will be updated by the Process User Request function 400 and processing ends. If the user request is to print a file, then the selected file is sent to a printer by the Print File function 402 according to the print file's print attributes. If the user request is to transfer a file, then the selected file is sent to another computer system by the Transfer File function 404 according to the print file's transfer attributes.

If a file is accepted by the system from another computer system, processing of the file mask must be performed by the Process File Mask function 406 to determine what to do with the incoming file. The Process File Mask function 406 accesses the File Database, Libraries, and Configurations 398. It instructs the Print File function 402 and the Transfer File function 404 to print a file or transfer a file, respectively, according to the selected file's file mask.

Figure 24:
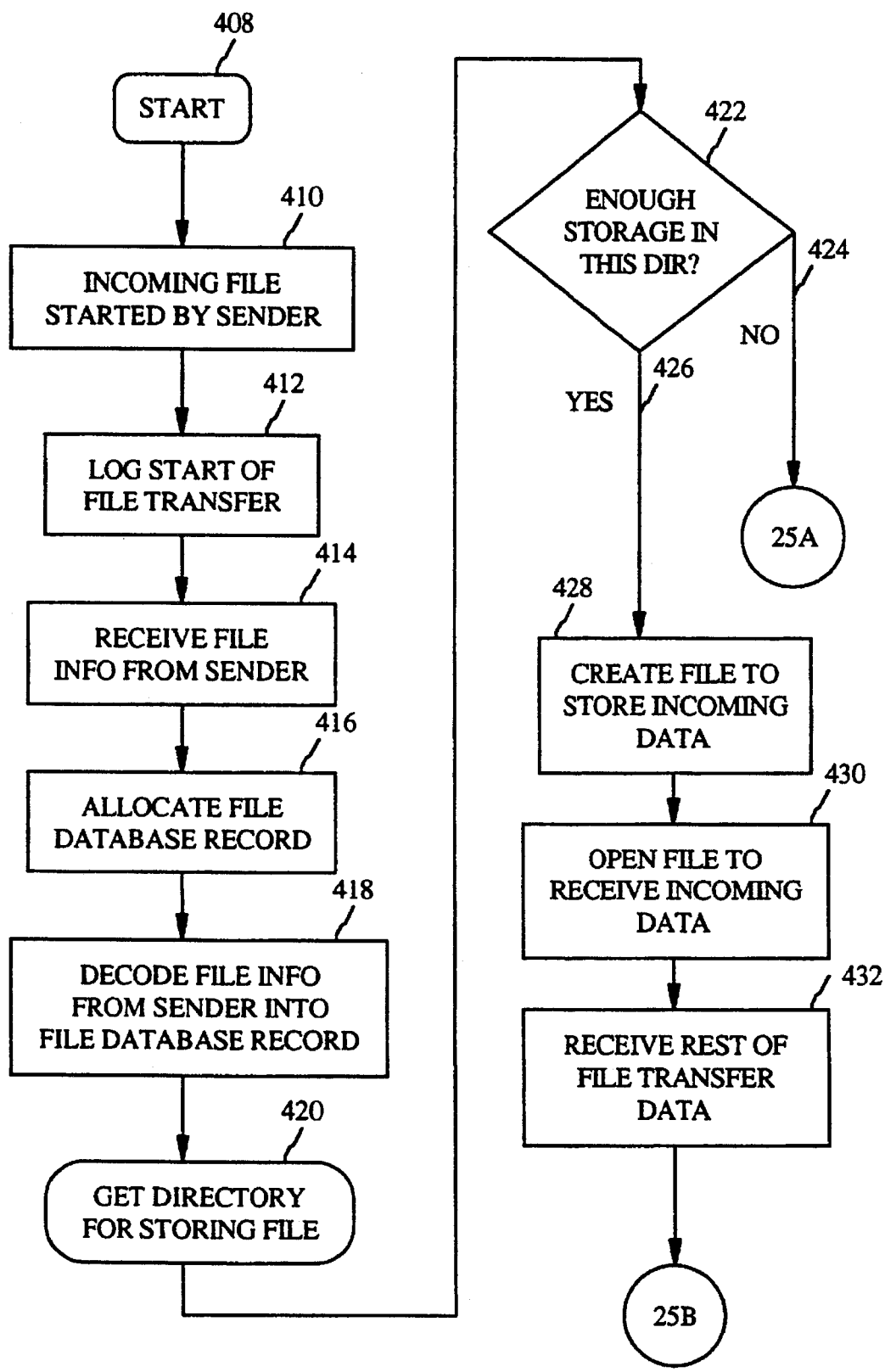
FIG. 24 through FIG. 26 are flow charts showing file mask processing for an incoming print file.
Figure 25:
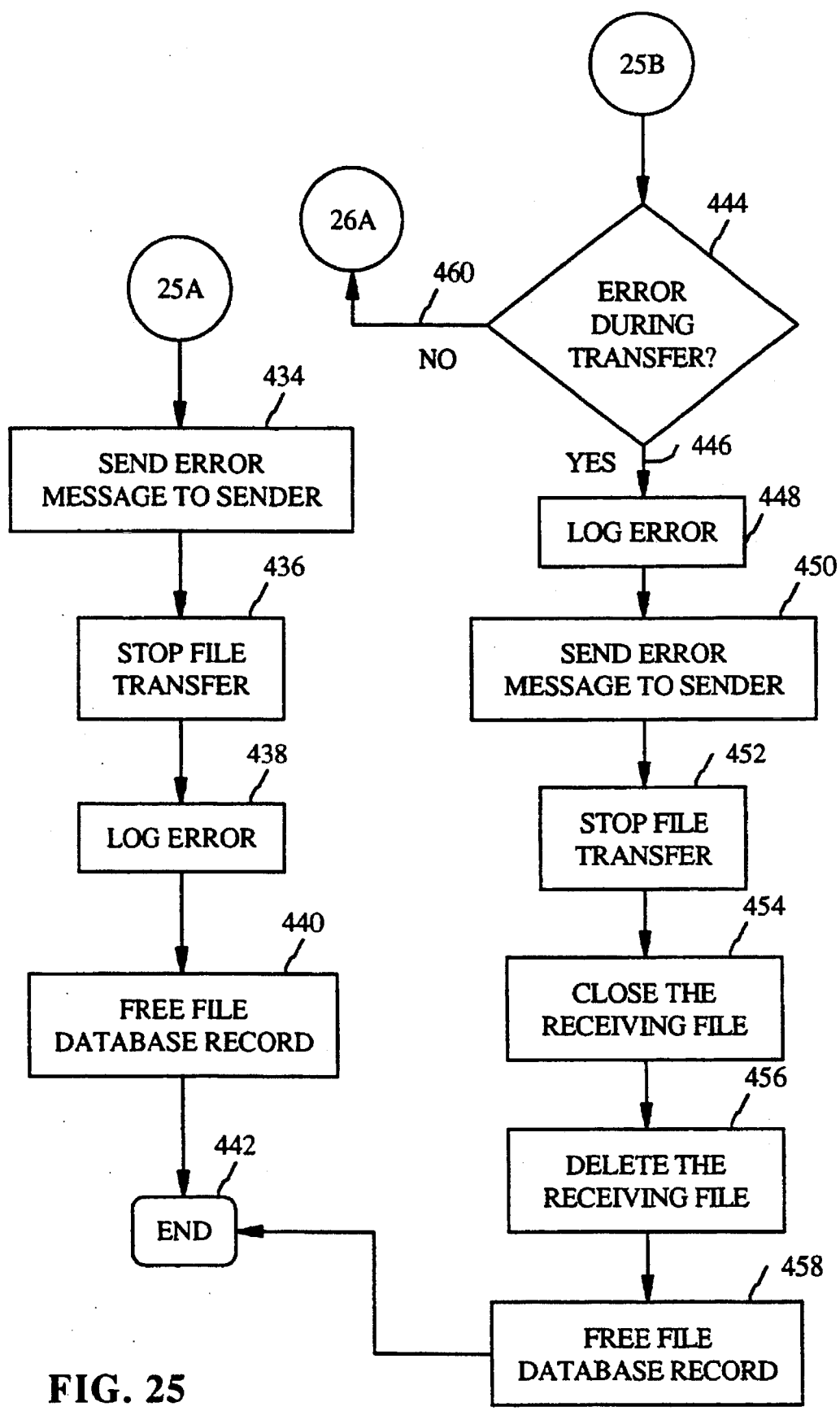
Figure 26:
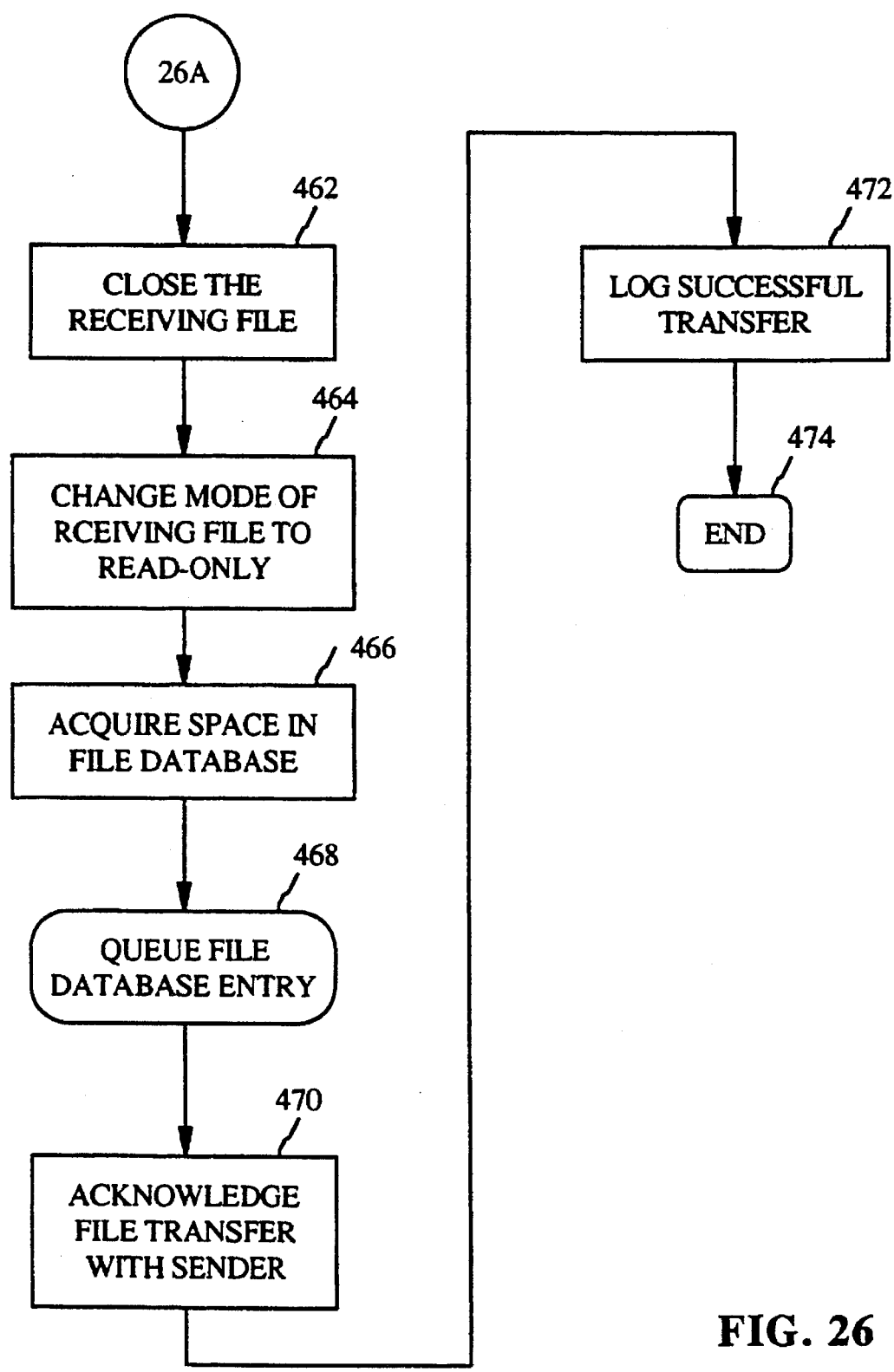

FIG. 24 through FIG. 26 are flow charts showing file mask processing for an incoming print file. Processing of the file mask begins at the Start Step 408. First, the transmission of an incoming file is started by a sender at Step 410. The sender is another computer system connected to the network. The start of the file transfer is written into a log file at Step 412. Next, the receiving system at Step 414 receives file information from the sender. For more details of the information sent, refer to the description of the system file transfer protocol discussed above for FIG. 6A through FIG. 6D.

The receiving system then allocates a File Database 296 record buffer at Step 416. This buffer holds the file information as it is received from the sending system. The file information sent by the sender is decoded at Step 418 and written into the File Database record. A procedure to get a directory for storing the incoming file is then called at Step 420. This directory must be accessible to the receiving system. This procedure is shown below in FIG. 27. Continuing processing on FIG. 24, the receiving system verifies that there is enough storage available in the selected directory at Test 422. If there is not enough storage, then the No path 424 is taken to FIG. 25 via connector 25A. If there is enough storage, Yes path 426 is taken and processing continues at Step 428 as a file is created in the selected directory to store the incoming file data. Next, at Step 430, a file is opened to receive the incoming data, and the system receives the rest of the file transfer data at Step 432. Processing then continues on FIG. 25 via connector 25B.

When not enough storage is available to store the incoming file, an error message is sent to the sending system at Step 434. The file transfer is stopped at Step 436, and the error is written into the log file (Step 438). The File Database record that was allocated to store the file's data is freed at Step 440, and processing ends at Step 442.

If there was enough storage in the directory, checks are made to ensure error-free transmission of the file. If an error occurs during the file transfer (Test 444), then the Yes path 446 is taken and the error identifier is written into the log file at Step 448. Next, the receiving system sends an error message to the sender at Step 450, and the file transfer is stopped at Step 452. The receiving file is closed (Step 454) and then deleted (Step 456). Finally, the File Database record is freed at Step 458 and processing ends at Step 442.

If there was no error during the file transfer, the No path 460 is taken to FIG. 26 via connector 26A. After all data has been received successfully, the receiving system closes the receiving file at Step 462. It changes the mode of the receiving file to read-only at Step 464. Next, it acquires space to store the file into the File Database 296 at Step 466. The procedure to queue a File Database entry is then called at Step 468. This procedure is described below in FIG. 31 and FIG. 32. An acknowledgment of the file transfer is sent by the receiving system to the sender to at Step 470. Finally, at Step 472 a successful status is written into the log file and processing ends at Step 474.

Figure 27:
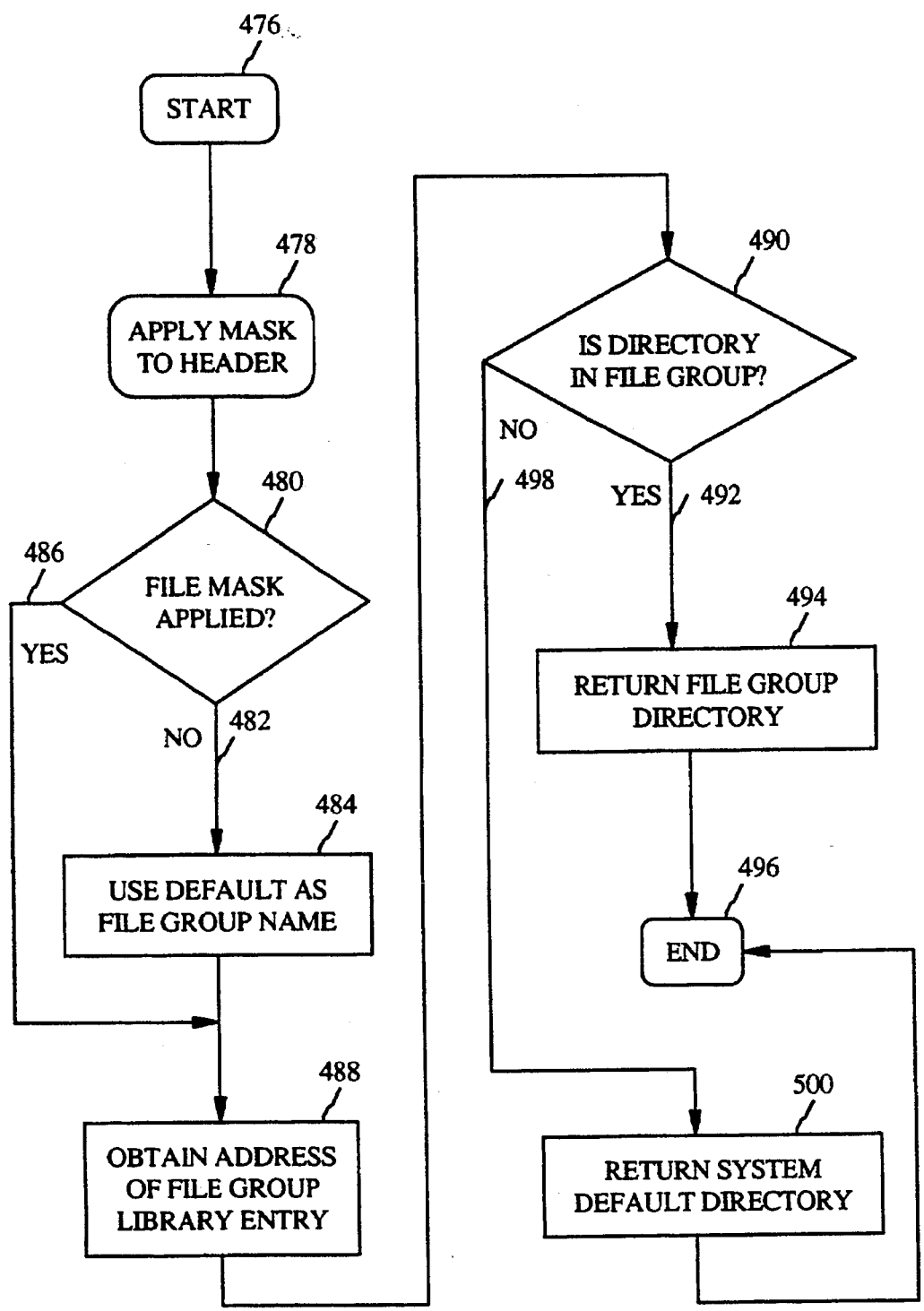
FIG. 27 is a flow chart showing the processing steps for getting a directory for storing a file.

FIG. 27 is a flow chart showing the processing steps for getting a directory for storing a file. Inputs to this process are the File Database record buffer containing file information received from the sender and the address where the directory name which consists of a string of characters is to be placed. The output from this process is a string of characters describing the directory path on the receiving system where the incoming file can be stored. Processing begins at Start Step 476. A procedure is called at Step 478 to apply a file mask to the file header information received from the sender, which is stored in the File Database record buffer. One output of this step is a file group name for the incoming file. Details of this process are described in FIG. 28 through FIG. 30 and discussed below. If a file mask has not been successfully applied (Test 480), then No path 482 is taken and a default value is used as the file group name for the incoming file at Step 484. Otherwise the Yes path 486 is taken. Next, the system obtains the address of a File Group Library 274 entry at Step 488. If the File Group Library entry at the designated address specifies a directory for storing files belonging to the selected file group (Test 490), then the Yes path 492 is taken to Step 494, where the specified file group directory is returned and processing ends (Step 496). Otherwise the No path 498 is taken and a system default directory path for storing the incoming file is returned (Step 500) before processing ends at Step 496.

Figure 28:
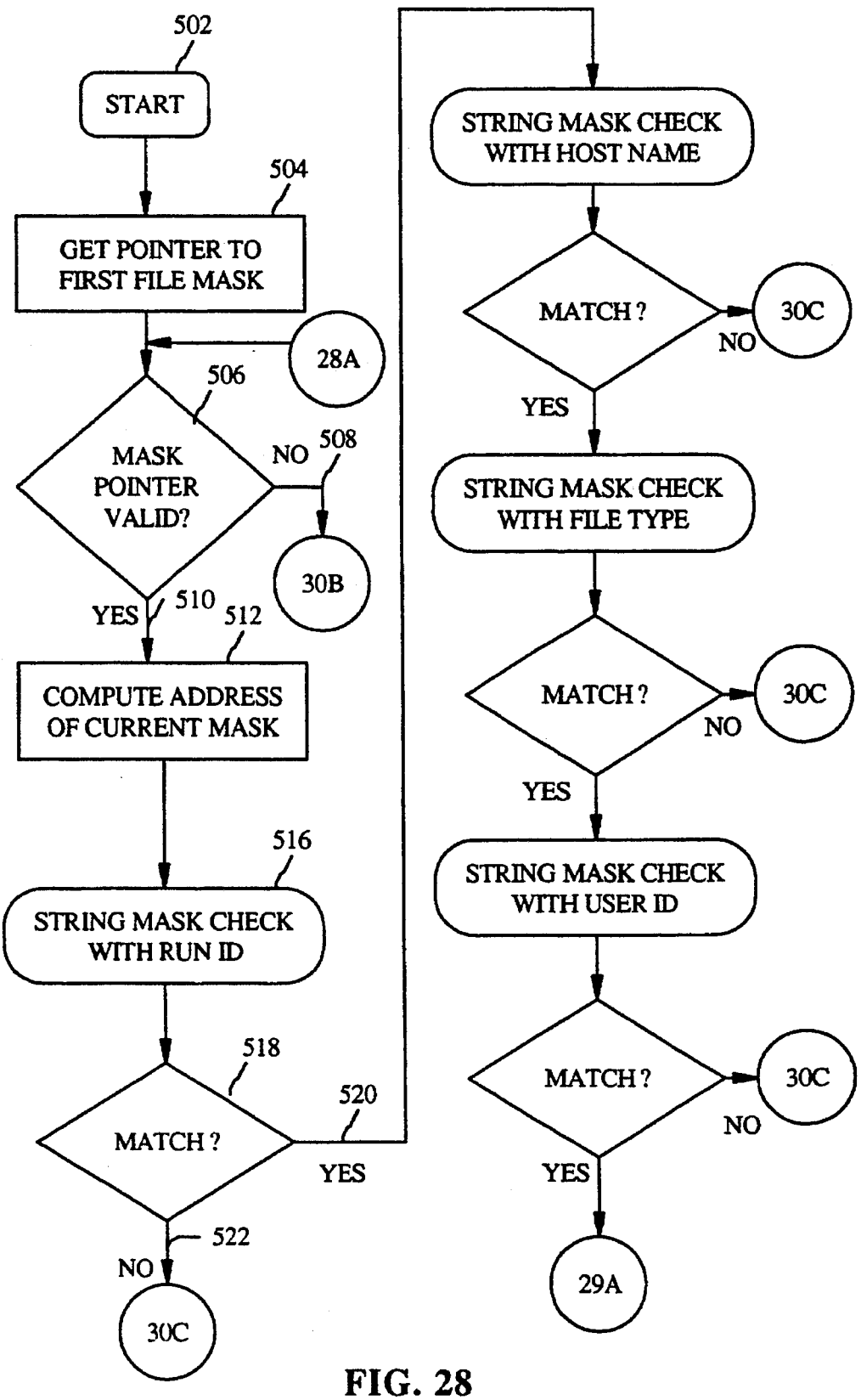
FIG. 28 through FIG. 30 are flow charts of the steps for applying file masks to file header information.
Figure 29:
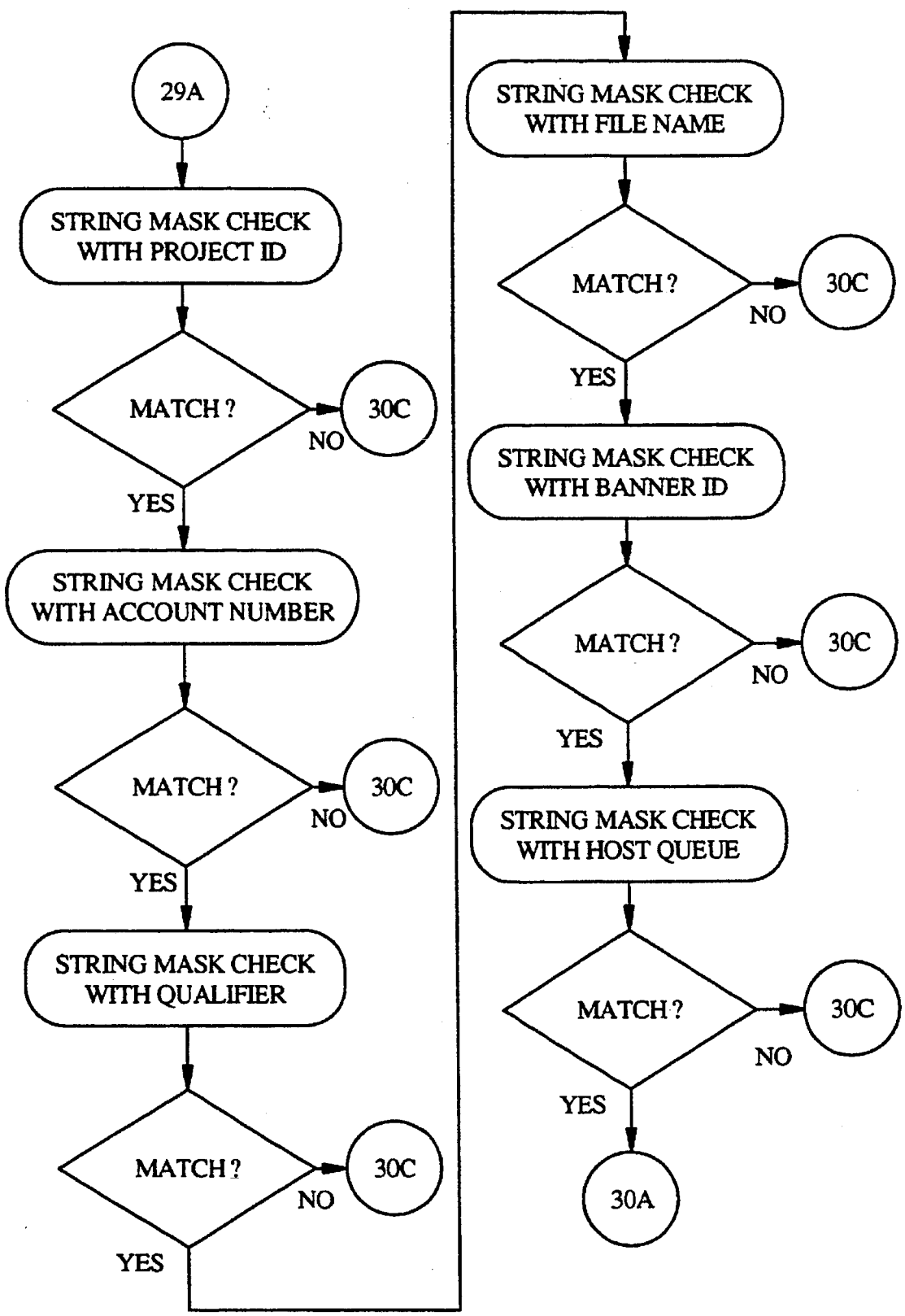
Figure 30:
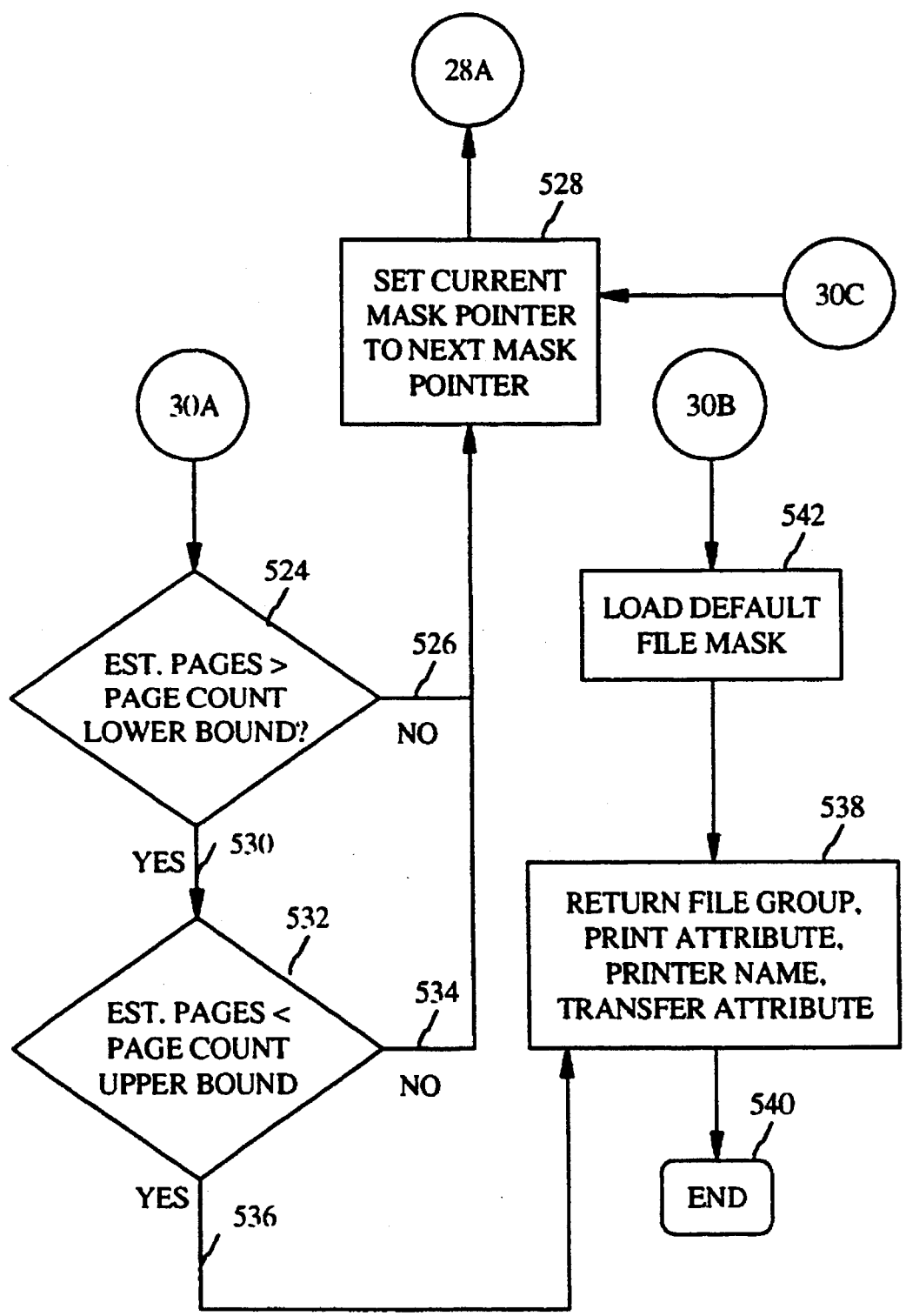

FIG. 28 through FIG. 30 are flow charts of the steps for applying file masks to file header information. This process takes the File Database record buffer as input and outputs a File Group Library 274 entry, a Print Attribute Library 280 entry, a Logical Printer 286 name, and a Transfer Attribute Library 282 entry. It attempts to match the file information received from the sender against the file masks in the File Mask Library 270 to determine subsequent processing to be performed on the incoming file. Processing begins at Step 502, and a pointer is obtained to the first file mask in the File Mask Library 270 at Step 504. If the file mask pointer is invalid (Test 506) (i.e., all file masks in the File Mask Library have been checked and no match was found), then the No path 508 is taken to FIG. 30 via connector 30B. If the file mask pointer is valid, then the Yes path 510 is taken to Step 512, where the storage address of the current file mask is computed. The values of the current file mask are then accessed via the storage address.

A series of calls to a String Mask procedure are made to determine if the values in the File Database record buffer match selected attribute values of the current file mask currently pointed to by the file mask pointer. All values of the file mask must match the values in the File Database record buffer for the file mask to be applied to the print file. The String Mask procedure compares the values of the file mask attributes described in FIG. 11 for the incoming file against the current file mask's attribute values. At Step 516, a string mask check is made with the Run ID. If there is a match at Test 518, then Yes path 520 is taken. If there is not a match, then No path 522 is taken to FIG. 30 via connector 30C. These steps are repeated for the file mask attributes of Host ID, File Type, and User ID on FIG. 28; and Project ID, Account Number, Qualifier, File Name, Banner ID, and Host Queue on FIG. 29.

On FIG. 30, the estimated pages values are compared to the page count lower and upper bounds in the Print File. If the estimated number of pages is greater than the page count lower bound at Test 524, the Yes path 530 is taken to Test 532. Otherwise the No path 526 is taken to Step 528. At this step, a match between the file masks has not occurred. The current file mask pointer is set to the next file mask pointer, so the next file mask in the File Mask Library may be considered. Processing then returns to FIG. 28 via connector 28A. If the estimated number of pages is less than the page count upper bound (Test 532), then the Yes path 536 is taken to Step 538. Arrival at Step 538 by Yes path 536 indicates that a successful file mask match has occurred. Thus, at Step 538, the file group, print attribute, printer name, and transfer attribute information is passed back to the caller of this process and processing ends at End Step 540. If the estimated number of pages is not less than the page count upper bound then the No path 534 is taken to Step 528. If there has been a match for any file mask in the File Mask Library, then at Step 542 the default file mask is loaded. Processing on this path continues with the return of the File Group Library 274 entry, the Print Attribute Library 280 entry, the Logical Printer 286 name, and the Transfer Attribute Library 282 entry, at Step 538 and processing ends at Step 542.

Figure 31:
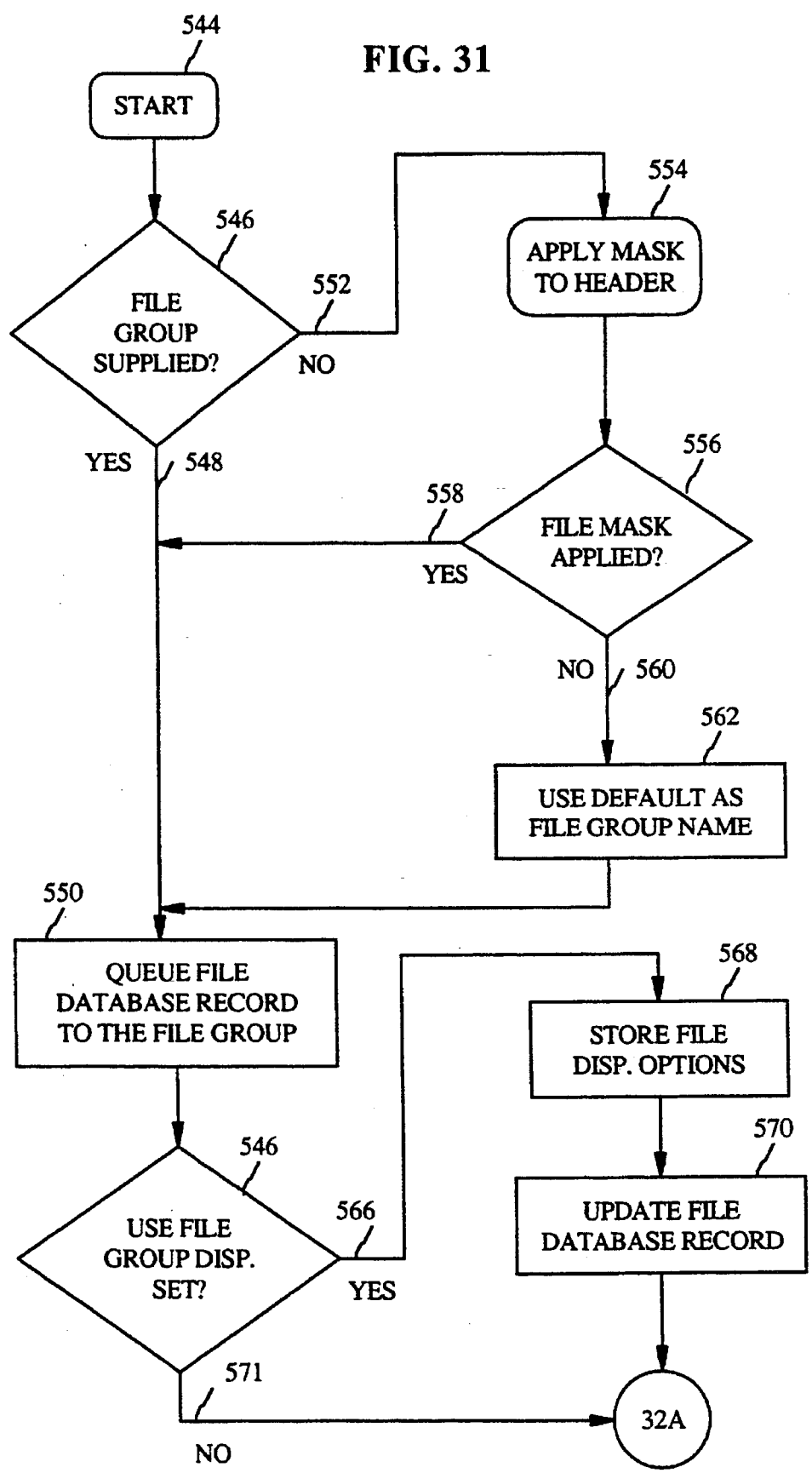
FIG. 31 and FIG. 32 are flow charts of the steps necessary to queue a File Database entry.
Figure 32:
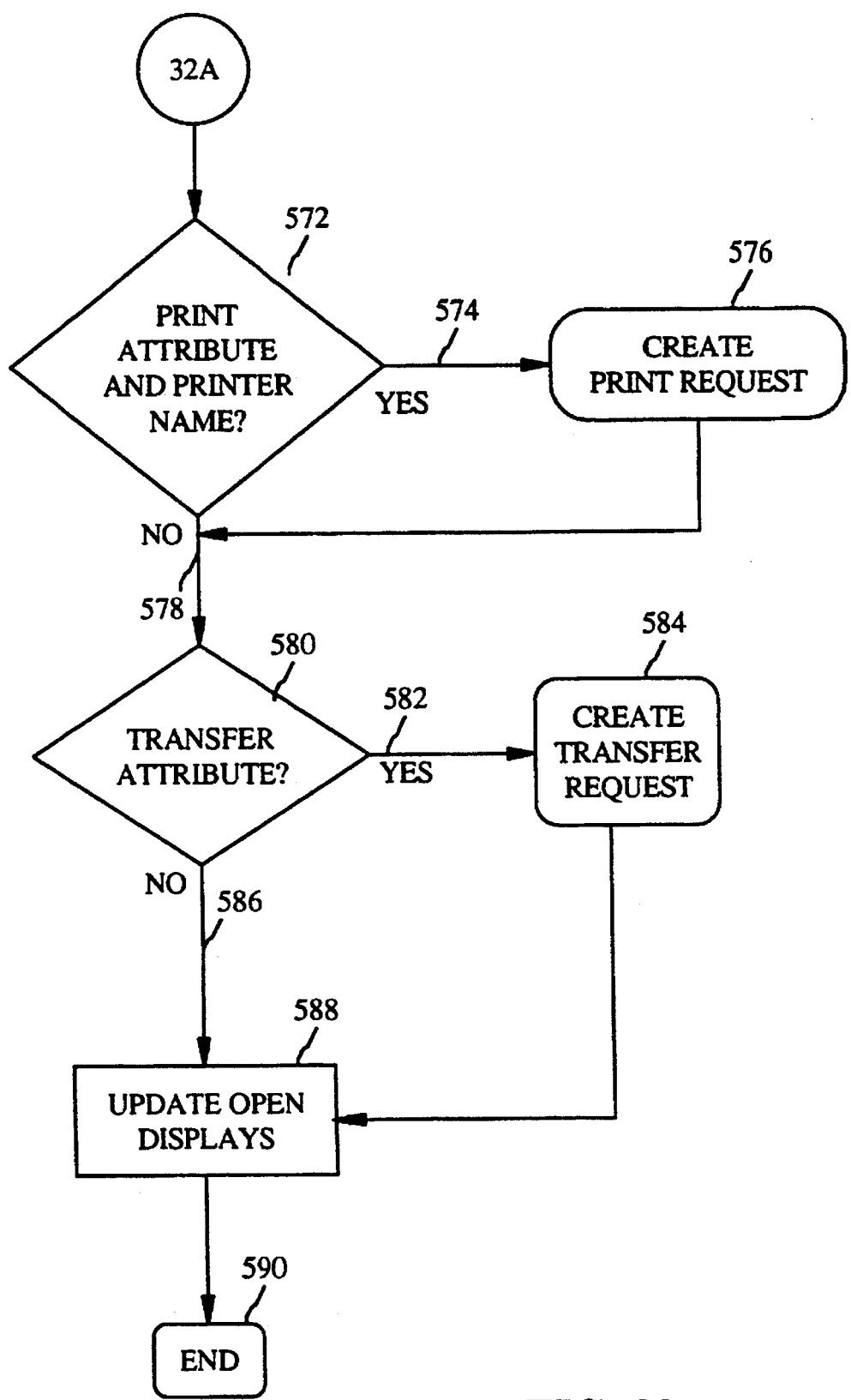

FIG. 31 and FIG. 32 are flow charts of the steps necessary to queue a File Database entry. This process takes as input a File Database 296 record buffer and a Use File Group disposition flag. Processing begins at Start Step 544. If a file group name is specified within the File Database record buffer (Test 546) then the Yes path 548 is taken to Step 550. At this step, the File Database record buffer is queued to the file group by inserting an entry into the File Group Library 274. If the file group name is not specified within the File Database record buffer, then the No path 552 is taken to Step 554 where the file masks in the File Mask Library 270 are applied to the incoming file header information as described above in FIG. 28 through FIG. 30. The result of this processing is the file group name, Print Attribute Library 280 entry, Logical Printer 286 name, and the Transfer Attribute Library 282 entry. If no file mask was applied successfully (Test 556) (i.e., no match was found), then the No path 560 is taken and a default file group name is used at Step 562. Otherwise, the Yes path 558 is taken to Step 550.

After the File Database record buffer has been queued, the input parameter Use File Group disposition flag is checked at Test 564. If the flag is set, then the Yes path 566 is taken to Step 568 where the file group disposition options are stored into the File Database record buffer. The File Database record buffer is updated in storage at Step 570. Processing then continues on FIG. 32 via connector 32A. If the Use File Group disposition flag is not set, the No path 571 is taken and processing continues on FIG. 32 via connector 32A.

If a print attribute and a printer name were specified by the Apply Mask To Header processing at Step 554 (Test 572), then the Yes path 574 is taken to Step 576. At this step, a request to print a file is created. This processing is detailed below in FIG. 33. Otherwise, the No path 578 is taken to Test 580. If a transfer attribute was specified by the Apply Mask To Header processing at Step 554, then the Yes path 582 is taken to Step 584, where a request to transfer a file is created. If a transfer attribute was not specified, then No path 586 is taken to Step 588. At Step 588, any open displays on the DEPCON PC component are updated to indicate the new file has arrived and new print and/or transfer jobs have been created. Processing ends at Step 590.

Figure 33:
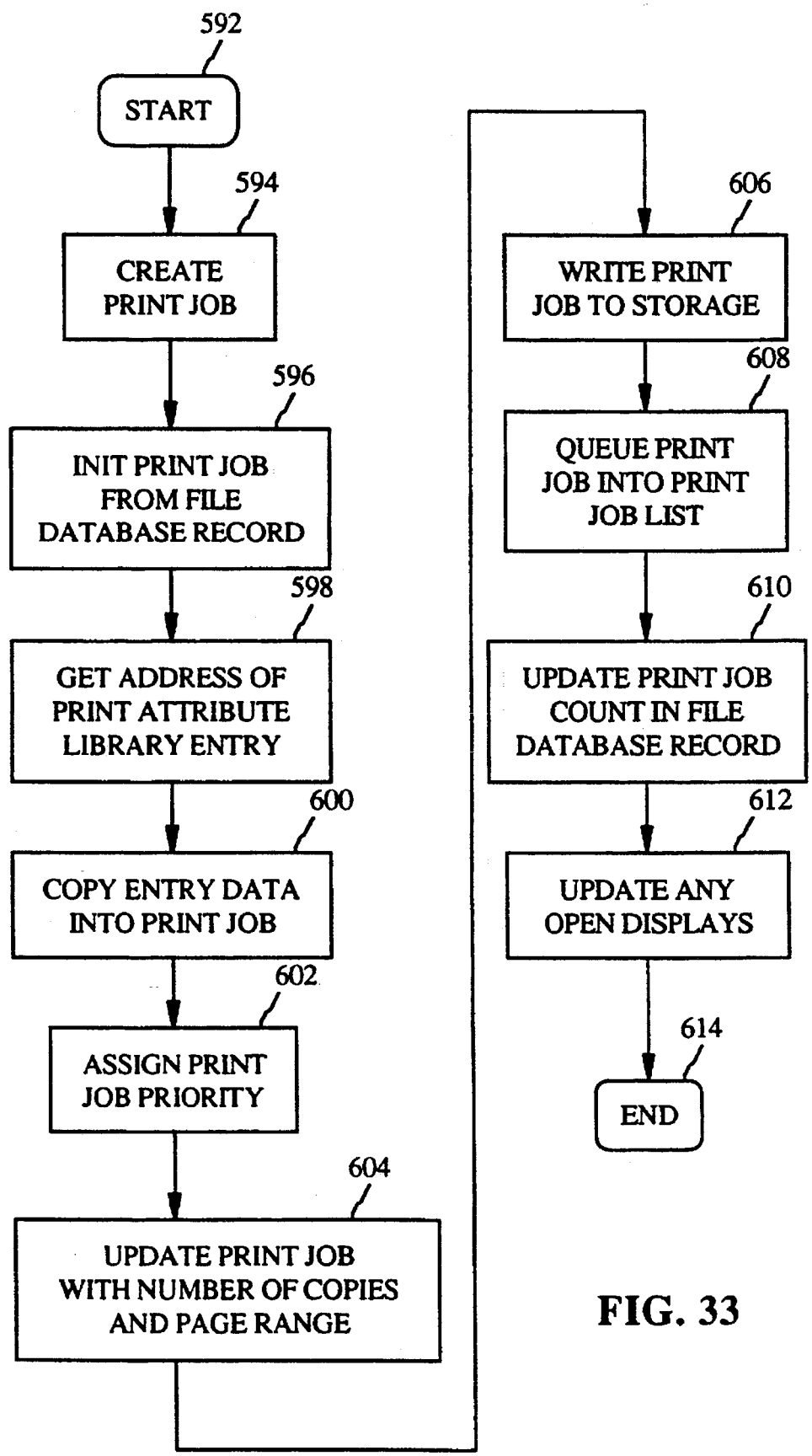
FIG. 33 is a flow chart of the steps for creating a print job.

FIG. 33 is a flow chart of the steps for creating a Print Job. This process takes as input the File Database record buffer, a Print Attribute Library 280 entry, a Logical Printer 286 name, a number of copies value, and page range values. Processing begins at Start Step 592. At Step 594 an empty Print Job 276 entry is created. The Print Job is initialized with information obtained from the File Database record buffer at Step 596. At Step 598 the address of the Print Attribute Library 280 entry is retrieved. The Print Attribute Library entry data is copied into the Print Job at Step 600. A priority based on the File Database record buffer and the current file group is assigned to the Print Job at Step 602. Next, at Step 604, the Print Job is updated with the number of copies value and the page range values. The Print Job is then written to storage at Step 606. At Step 608, the Print Job is queued into the list of Print Jobs. The Print Job count contained in the File Database record buffer is updated at Step 610 to indicate the new Print Job for the print file. Finally, any open displays of information for the PC component are updated with the new Print Job at Step 612 and processing ends at Step 614.

Figure 34:
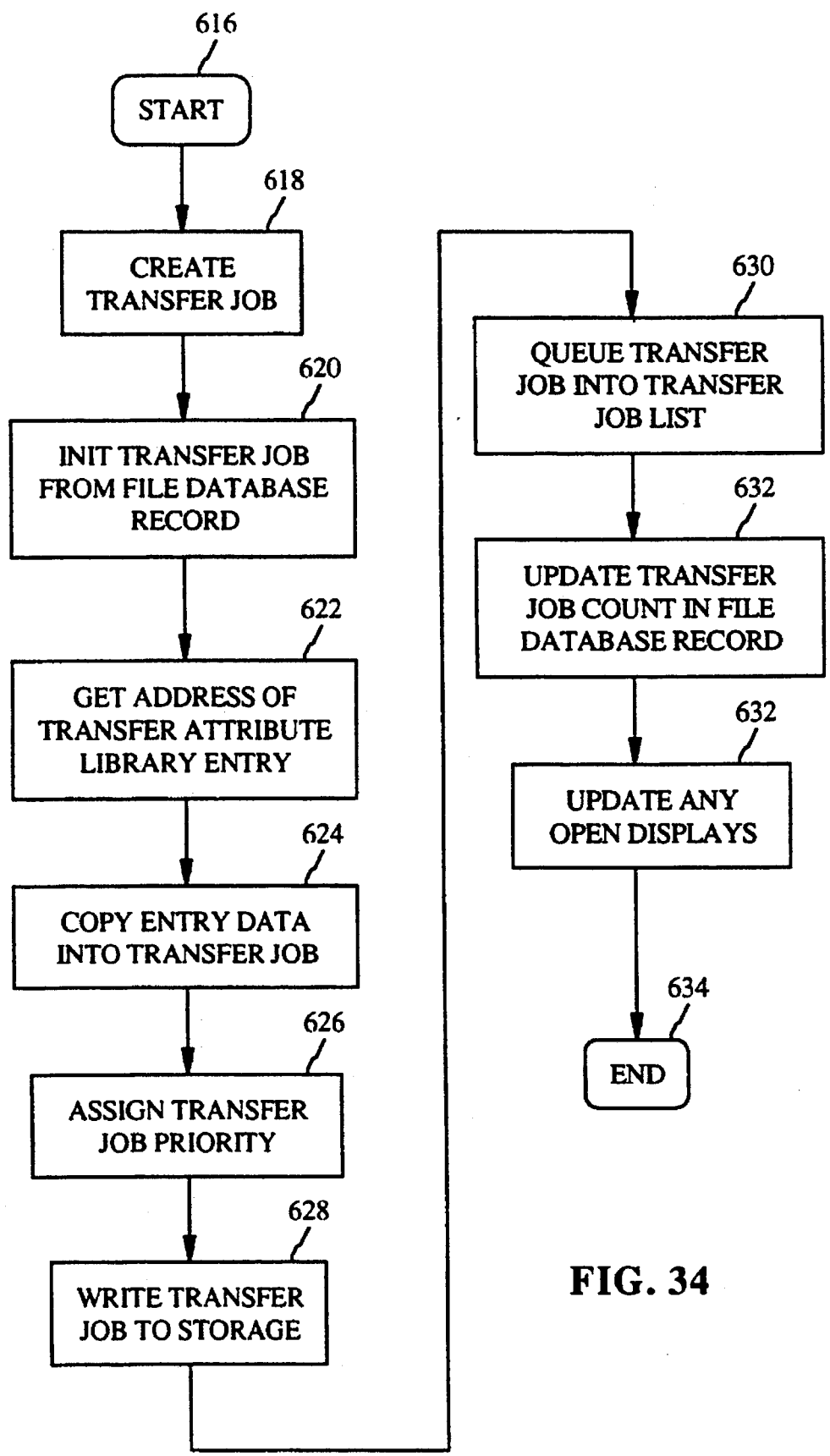
FIG. 34 is a flow chart of the steps for creating a transfer job.

FIG. 34 is a flow chart of the steps for creating a Transfer Job. This process takes as input the File Database record buffer and a Transfer Attribute Library 282 entry. Processing begins at Start Step 616. At Step 618 an empty Transfer Job 278 entry is created. The Transfer Job is initialized with information obtained from the File Database record buffer at Step 620. At Step 622 the address of the Transfer Attribute Library 282 entry is retrieved. The Transfer Attribute Library entry data is copied into the Transfer Job at Step 624. A priority based on the File Database record buffer and the current file group is assigned to the Transfer Job at Step 626. The Transfer Job is then written to storage at Step 628. At Step 630, the Transfer Job is queued into the list of Transfer Jobs. The Transfer Job count contained in the File Database record buffer is updated at Step 632 to indicate the new Transfer Job for the print file. Finally, any open displays of information for the PC component are updated with the new Transfer Job at Step 634 and processing ends at Step 636.

A system for transferring and printing files in a distributed computer environment has been disclosed. The system provides users with a flexible and powerful graphical user interface for controlling the transfer and printing of files generated on mainframe computer systems, UNIX workstations, and personal computers connected in a computer network. It automatically classifies incoming files according to file masks and generates either print or transfer jobs as required. The invention provides a distributed printing system for multiple computer systems supporting multiple printers connected to heterogeneous computer networks.

The invention has been described in its presently contemplated best mode, and it is clear that it is susceptible to various modifications, modes of operation and embodiments, all within the ability and skill of those skilled in the art and without the exercise of further inventive activity. Accordingly, what is intended to be protected by Letters Patents is set forth in the appended claims.

What is claimed is:

1. A distributed printing control system for transferring files between computer systems connected by a computer network, each of the computer systems having a memory, and printing files on printers coupled to the computer systems comprising:

file database means for storing a file to and retrieving said file from the memory, said file containing a file mask specifying file identification, transfer, and printing parameters, and for storing and retrieving a predetermined set of file masks;

file mask processing means coupled to said file database means for comparing said file mask of said file against said predetermined set of file masks stored in said file database means, for creating a transfer job to transfer said file or a print job to print said file or both said transfer job and said print job according to said file mask when said file mask matches a file mask in said predetermined set of file masks, and for directing said file database means to store said file;

file transfer means coupled to said file database means and said file mask processing means for executing said transfer job to transfer said file according to said file mask to another computer system coupled to the computer network; and file print means coupled to said file database means and said file mask processing means for executing said print job to print said file according to said file mask on a computer printer interfaced to a computer system coupled to the computer network.

2. The distributed printing control system as in claim 1, wherein said file transfer means automatically transfers said file to a selected computer system according to said file mask without user intervention.

3. The distributed printing control system as in claim 1, wherein said file print means automatically prints said file on a selected computer printer according to said file mask without user intervention.

4. The distributed printing control system as in claim 1, wherein said file transfer means transfers and said file print means prints files containing POSTSCRIPT print commands.

5. The distributed printing control system as in claim 1, wherein said file transfer means transfers and said file print means prints files containing PCL print commands.

6. The distributed printing control system as in claim 1, wherein said file mask comprises file attributes that define characteristics of said file, transfer attributes that define how said file is to be transferred to another computer system, print attributes that define how said file is to be printed on a printer connected to the computer network, and destination printer identification.

7. The distributed printing control system as in claim 6, wherein said file database means comprises:

file mask means for storing and retrieving file masks;

transfer attribute means coupled to said file mask means for storing and retrieving sets of said transfer attributes specifying how, when, and where said file is to be transferred; and print attribute means coupled to said file mask means for storing and retrieving sets of said print attributes specifying how, when, and where said file is to be printed.

8. The distributed printing control system as in claim 1, wherein said file database means further comprises system configuration means for storing and retrieving data signals indicative of the operational parameters of said system.

9. The distributed printing control system as in claim 8, wherein said file database means further comprises communications configuration means coupled to said transfer attribute means for storing and retrieving the communications paths used to send and receive said file.

10. The distributed printing control system as in claim 9, wherein said file database means further comprises file group means coupled to said file mask means for grouping files according to said file mask.

11. The distributed printing control system as in claim 10, wherein said file database means further comprises file storage means coupled to said file group means for storing and retrieving said file.

12. The distributed printing control system as in claim 11, wherein said file database means further comprises physical printer configuration means coupled to said file mask means for storing and retrieving a list of printers connected to computer systems within the computer network.

13. The distributed printing control system as in claim 12, wherein said file database means further comprises logical printer configuration means coupled to said file mask means for storing, searching, and retrieving a mapping of logical printers to printers.

14. The distributed printing control system as in claim 13, wherein said file database means further comprises header and trailer page configuration means coupled to said print attribute means for specifying the format of header pages and trailer pages to be printed when said file is printed on a printer.

15. The distributed printing control system as in claim 14, wherein said file database further comprises coded character set means coupled to said print attribute means for specifying a set of actions to be performed during the printing of said file when predetermined control characters are present in said file.

16. The distributed printing control system as in claim 15, wherein said file database further comprises translate table means coupled to said coded character set means and said physical printer configuration means for translating character codes contained in said file into different character codes.

17. The distributed printing control system as in claim 1, further comprising:
  file input means coupled to said file mask processing means for accepting a file sent by another computer system within the computer network, whereby said file input means interfaces with a computer system in the computer network by using a peer-to-peer communications protocol.

18. The distributed printing control system as in claim 17, wherein said peer-to-peer communications protocol is transmission control protocol/internet protocol.

19. The distributed printing control system as in claim 17, further comprising:
  user interface means for accepting requests from a user to control the transferring and printing of said file by modifying said file mask; and
  user request processing means coupled to said user interface means, said file database means, said file transfer means, and said file print means for directing said file database means for selectively updating said file mask of said file stored in said file database means.

20. A computer-based distributed printing control system for transferring files between computer systems, each computer system having a memory, connected by a heterogeneous computer network and for printing the files on printers supporting different page description languages coupled to the computer systems comprising:
  a system database for storing and retrieving files between a computer system's memory, each of said files containing a file mask specifying file identification, transfer, and printing parameters;
  file input means for accepting a file sent by another computer system within the computer network, whereby said file input means interfaces with a computer system in the heterogeneous computer network by using a peer-to-peer protocol;
  user interface means for accepting requests from a user to control the transferring and printing of said file by modifying said file mask;
  user request processing means coupled to said user interface means and said system database for directing said system database to selectively update said file mask of said file stored in said system database;
  file mask processing means coupled to said file input means and said system database for comparing said file mask contained in said file received from said file input means against a predetermined set of file masks stored in said system database, for creating a transfer job to transfer said file or a print job to print said file or both said transfer job and said print job according to said file mask when said file mask matches one in said predetermined set of file masks, and for directing said system database to store said file;
  file transfer means coupled to said system database, said file mask processing means, and said user request processing means for executing said transfer job to automatically transfer said file according to said file mask to another computer system coupled to the computer network; and
  file print means coupled to said system database, said file mask processing means, and said user request processing means for executing print job to automatically print said file according to said file mask on a computer printer interfaced to a computer system coupled to the computer network.

21. The distributed printing control system as in claim 20, wherein said file input means interfaces with computer systems in the computer network by using a peer-to-peer transmission control protocol/internet protocol.

22. The distributed printing control system as in claim 20, wherein said file transfer means transfers and said file print means prints files containing POSTSCRIPT print commands.

23. The distributed printing control system as in claim 20, wherein said file transfer means transfers and said file print means prints files containing PCL print commands.

24. The distributed printing control system as in claim 20, wherein said file mask comprises file attributes that define characteristics of said file, transfer attributes that define how said file is to be transferred to another computer system, print attributes that define how said file is to be printed on a printer connected to the computer network, and destination printer identification.

25. The distributed printing control system as in claim 24, wherein said system database comprises:
  a file mask library for storing file masks;
  a transfer attribute library coupled to said file mask library for storing sets of said transfer attributes specifying how, when, and where said file is to be transferred; and
  a print attribute library coupled to said file mask library for storing sets of said print attributes specifying how, when, and where said file is to be printed.

26. The distributed printing control system as in claim 25, wherein said system database further comprises a system configuration for storing and retrieving data signals indicative of the operational parameters of said system.

27. The distributed printing control system as in claim 26, wherein said system database further comprises a communications configuration coupled to said transfer attribute library, said communications configuration specifying the possible communications paths used to send and receive files.

28. The distributed printing control system as in claim 27, wherein said system database further comprises a file group library coupled to said file mask library, each of said file group library entries specifying groups of files according to said file mask.

29. The distributed printing control system as in claim 28, wherein said system database further comprises a file database coupled to said file group library, said file database storing files.

30. The distributed printing control system as in claim 29, wherein said system database further comprises a physical printer configuration coupled to said file mask library, said physical printer configuration including a list of printers connected to computer systems within the computer network.

31. The distributed printing control system as in claim 30, wherein said system database further comprises a logical printer configuration coupled to said file mask library, each of said logical printer configuration entries specifying a logical-to-physical mapping of printers.

32. The distributed printing control system as in claim 31, wherein said system database further comprises a header and trailer page configuration coupled to said print attribute library, each of said header and trailer page configuration entries specifying the format of header pages and trailer pages to be printed when said file is printed on a printer.

33. The distributed printing control system as in claim 32, wherein said system database further comprises a coded character set library coupled to said print attribute library, each of said coded character set library entries specifying a set of actions to be performed during the printing of said file when predetermined control characters are present in said file.

34. The distributed printing control system as in claim 33, wherein said system database further comprises a translate table library coupled to said coded character set library and said physical printer configuration, each of said translate table library entries being used to translate character codes contained in said file into different character codes.

35. A computer-implemented process for transferring files between computer systems connected by a computer network and printing files on computer printers coupled to the computer systems, each of the files having an embedded file mask specifying file identification information, transfer attributes, and print attributes, each computer system having a file mask library for storing file masks, comprising the steps of:

(a) comparing a file mask embedded within a file stored on a computer system to the file masks in the computer system's file mask library;

(b) creating a print job for selectively printing said file on a printer when said file mask contained in said file contains print attributes;

(c) creating a transfer job for selectively transferring said file to another computer system in the computer network when said file mask embedded within said file contains transfer attributes; and (d) executing said print job, said transfer job, or both said print job and said transfer job according to said file mask.

36. A computer-implemented process for transferring files between computer systems connected by a computer network and printing files on printers coupled to the computer systems, each of the files having an embedded file mask specifying file identification information, transfer attributes, and print attributes, each computer system having a file mask library for storing file masks, comprising the steps of:

(a) storing a file received by a computer system from another computer system over a computer network;

(b) comparing a file mask embedded within said file to the file masks in the file mask library;

(c) adding said file to a file group specified by an entry in said file mask library when said entry matches said file mask embedded within said file;

(d) creating a print job for selectively printing said file on a computer printer when said file mask embedded within said file contains print attributes;

(e) creating a transfer job for selectively transferring said file to another computer system in the computer network when said file mask embedded within said file contains transfer attributes: and (f) executing said print job, said transfer job, or both said print job and said transfer job according to said file mask.

37. A computer-implemented process as in claim 36, further comprising the step of:

(g) modifying said print job, said transfer job, or both said print job and said transfer job according to a request received from a user.

38. A computer-implemented process as in claim 37, further comprising the step of:

(h) deleting said file from said computer system.

39. A computer-implemented process for transferring files between computer systems connected by a computer network and printing files on computer printers coupled to the computer systems, each of the files having an embedded file mask specifying file identification information, transfer attributes, and print attributes, each computer system having a file mask library for storing file masks, comprising the steps of:

(a) storing a file received by a computer system from another computer system over a computer network into a file database;

(b) comparing a file mask embedded within said received file to the file masks in the file mask library;

(c) adding said file to a file group specified by an entry in said file mask library when said entry matches said file mask embedded within said file;

(d) creating a print job with printing attributes including an assigned priority, for selectively printing said file on a computer printer when said file mask contains print attributes;

(e) creating a transfer job with transfer attributes including an assigned priority for selectively transferring said file to said destination computer system in the computer network when said file mask embedded within said file contains transfer attributes;

(f) receiving a request from a user to modify said print job, said attribute job, or both said print job and said transfer job;

(g) modifying said print job, said transfer job, or both said print job and said transfer job according to the request received from the user;

(h) executing said print job, said transfer job, or both said print job and said transfer job according to said assigned priorities; and (i) deleting said file from said computer system.

40. A computer-implemented process as in claim 39, wherein said creating a print job step includes defining printing characteristics for printing said file and a printer identifier of said computer printer on which said file is to be printed.

41. A computer-implemented process as in claim 40, wherein said creating a transfer job step includes defining a communications path for transferring said file, identifying said computer system to receive said file, and defining a time range when said file is to be transferred.

42. A computer-implemented process for transferring files between computer systems connected by a computer network and printing files on computer printers coupled to the computer systems, each of the computer systems having an attached computer display, each of the files having an embedded file mask specifying file identification information, transfer attributes, and print attributes, comprising the steps of:

(a) accepting a file by a computer system from another computer system in the computer network;

(b) assigning said file to a file group when a file mask embedded in said file matches the file mask of said file group;

(c) storing said file in a file database on said computer system with other files in said file group;

(d) creating a print job with printing attributes including an assigned priority, printing characteristics for printing said file, and a printer identifier of said computer printer on which said file is to be printed, for selectively printing said file when said file mask contains print attributes;

(e) creating a transfer job with transfer attributes including an assigned priority, a communications path for transferring said file, identification of said destination computer system to receive said file, and a time range when said file is to be transferred, for selectively transferring said file to said destination computer system in the computer network when said file mask embedded within said file contains transfer attributes;

(f) updating the computer display coupled to said computer system to reflect the change in printing system status as a result of the creation of a print job, a transfer job, or both a print job and a transfer job;

(g) accepting a request to modify a print job, a transfer job, or both a print job and a transfer job from a user;

(h) modifying said print job, said transfer job, or both said print job and said transfer job according to the request received from the user;

(i) executing said print job, said transfer job, or both said print job and said transfer job according to said assigned priorities; and (j) deleting said file from said computer system.

* * * * *